United States Patent
Rasmussen et al.

(10) Patent No.: US 9,330,525 B2
(45) Date of Patent: May 3, 2016

(54) TRANSMISSIVE DISPLAY HAVING MULTIPLE SWITCHABLE REGIONS OF A DIFFUSER FILM LAYER ASSEMBLY

(75) Inventors: James M. Rasmussen, Chicago, IL (US); Timothy C. Loose, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1135 days.

(21) Appl. No.: 13/387,203

(22) PCT Filed: Jul. 28, 2010

(86) PCT No.: PCT/US2010/043478
§ 371 (c)(1),
(2), (4) Date: Jan. 26, 2012

(87) PCT Pub. No.: WO2011/014532
PCT Pub. Date: Feb. 3, 2011

(65) Prior Publication Data
US 2012/0122549 A1 May 17, 2012

Related U.S. Application Data

(60) Provisional application No. 61/229,532, filed on Jul. 29, 2009.

(51) Int. Cl.
*G02F 7/00* (2006.01)
*G02F 1/1335* (2006.01)
(Continued)

(52) U.S. Cl.
CPC ........ *G07F 17/3211* (2013.01); *G02F 1/13476* (2013.01); *G02F 1/133504* (2013.01); *G02F 2203/62* (2013.01)

(58) Field of Classification Search
CPC combination set(s) only.
See application file for complete search history.

(56) References Cited

U.S. PATENT DOCUMENTS

2004/0227866 A1* 11/2004 Okada ............................. 349/58
2005/0176493 A1   8/2005 Nozaki et al.
(Continued)

FOREIGN PATENT DOCUMENTS

WO     2006/015046 A2    2/2006
WO   WO2006/015046 A2    2/2006
(Continued)

OTHER PUBLICATIONS

PCT International Preliminary Report on Patentability from International Application No. PCT/US2010/043478, dated Jan. 25, 2012 (10 pages).
(Continued)

*Primary Examiner* — Lauren Nguyen
(74) *Attorney, Agent, or Firm* — Nixon Peabody LLP

(57) ABSTRACT

A switchable transmissive display for a gaming system has an underlying display mode and a full video mode. The switchable transmissive display includes a first underlying display and a second display overlaying the first display. The second display includes a transmissive liquid crystal panel, a backlight assembly and a switchable diffuser film layer. The backlight assembly includes a transmissive aperture behind which the first underlying display is positioned. The second display also includes a supplemental backlight directed at the aperture. The second display has a first mode where the switchable diffuser film layer is transparent to allow viewing the first display and a second mode where the switchable diffuser film layer is translucent to obscure the transmissive aperture and an image is displayed. The switchable diffuser film layer distributes light to provide substantially homogeneous light intensity across the back of the transmissive liquid crystal panel.

20 Claims, 18 Drawing Sheets

(51) Int. Cl.
*G02F 1/1347* (2006.01)
*G07F 17/32* (2006.01)

(56) References Cited

U.S. PATENT DOCUMENTS

2007/0069974 A1* 3/2007 Kawata et al. ................. 345/1.1
2008/0113755 A1  5/2008 Rasmussen et al.

FOREIGN PATENT DOCUMENTS

WO    2008/011049 A2   1/2008
WO    WO2008/011049 A2 1/2008

OTHER PUBLICATIONS

PCT International Search Report and Written Opinion of the International Searching Authority from International Application No. PCT/US2010/043478, dated Sep. 24, 2010 (4 pages).

PCT International Search Report for International Application No. PCT/US2010/043478, dated Sep. 24, 2010 (1 page).

PCT Written Opinion of the International Searching Authority for International Application No. PCT/US2010/043478, Dated Sep. 24, 2010.

* cited by examiner

TRANSMISSIVE DISPLAY HAVING MULTIPLE SWITCHABLE REGIONS OF A DIFFUSER FILM LAYER ASSEMBLY

PRIORITY CLAIM AND CROSS REFERENCE TO RELATED APPLICATIONS

This application is a U.S. national stage of International Application No. PCT/US2010/043478 filed on Jul. 29, 2010, which is related to and claims priority to U.S. Provisional Application No. 61/229,532, filed on Jul. 29, 2009, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to switchable transmissive displays and more particularly relates to transmissive displays having a full video mode to allow video based wagering games and an underlying display mode to allow wagering games on an underlying display.

BACKGROUND OF THE INVENTION

Gaming terminals, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

LCDs (liquid crystal displays) have long been incorporated into gaming machines to enhance the flexibility of the displayed wagering games. However, some players prefer to see mechanical reels rather than a video rendering of a slot machine game, in part due to the more traditional appearance and perceived trustworthiness of the rotating mechanical slot reels. Utilization of mechanical reels makes the wagering game more enjoyable for such players, but limits the ability of the wagering game machine to present computer graphics and animation to enhance the theme of the wagering game or to provide other information, and so may be less entertaining to players than a wagering game utilizing a touchscreen LCD wagering game system.

Various transmissive displays in conjunction with mechanical reels have been proposed for various gaming platforms. However, such displays are tailored to a specific game and a specific number of reels. Changing games in such platforms is cumbersome and generally requires the replacement of the display if the game format is changed to an exclusively video format or an exclusively mechanical slot reel format (whether actual reels or simulated mechanical reels) or a mechanical slot reel format allowing different numbers of reels.

SUMMARY OF THE INVENTION

According to one example, a gaming system display is disclosed. The gaming system display includes a first underlying display and a second display disposed to overlay at least a portion of the first underlying display. The second display includes a transmissive liquid crystal panel, a backlight assembly, and a switchable diffuser film layer between the transmissive liquid crystal panel and the backlight assembly. The backlight assembly includes a transmissive aperture behind which a corresponding portion of the first underlying display is positioned. The second display further includes a supplemental backlight directed to the aperture. The second display has a first mode where the switchable diffuser film layer is transparent to allow viewing of the at least a portion of the first display. The second display has a second mode where the switchable diffuser film layer is translucent to obscure the transmissive aperture and distribute light from the backlight and the supplemental backlight to provide substantially homogeneous light intensity across the back of the transmissive liquid crystal panel. An image is displayed on the second display in the second mode.

A second example disclosed is a switchable transmissive display including at least one projector. A first screen is disposed in front of the at least one projector and the at least one projector projects a first image on the first screen. A video display is disposed to overlay at least a portion of the first screen. The video display includes a transmissive liquid crystal panel, a switchable diffuser film and a backlight assembly including a transmissive aperture behind which a corresponding portion of the first screen is positioned. The second display has a first mode switching the switchable diffuser film to a transparent state to allow viewing of the at least a portion of the first screen. The second display has a second mode switching the switchable diffuser film to a translucent state to obscure the transmissive aperture. A second image is displayed in the second mode. A moveable barrier is located between the video display and the first screen. The moveable barrier has a first position to create a first number of windows from the transmissive aperture in the first mode. The moveable barrier has a second position to create a second number of windows from the transmissive aperture in the first mode.

Another example disclosed is a gaming system display including a first underlying display and a second display disposed to overlay at least a portion of the first underlying display. The second display includes a transmissive liquid crystal panel and a backlight assembly. A moveable diffuser layer is located between the transmissive liquid crystal and the backlight assembly. The moveable diffuser layer includes a diffuser aperture. The backlight assembly defining a transmissive aperture behind which a corresponding portion of the first underlying display is positioned. The second display has a first mode positioning the moveable diffuser layer to align the diffuser aperture with the transmissive aperture to allow viewing of the at least a portion of the first display. The second display has a second mode positioning the moveable diffuser layer so the diffuser aperture is out of alignment with the transmissive aperture to obscure the transmissive aperture and distribute light from the backlight assembly and display an image on the second display.

Another example is a gaming system display including a first underlying display and a second display disposed to overlay at least a portion of the first underlying display. The second display includes a transmissive liquid crystal panel, a switchable diffuser film layer and a backlight assembly including a transmissive aperture behind which a corresponding portion of the first underlying display is positioned. The second display has a first mode to allow viewing of the at least a portion of the first display via switching a part of the switchable diffuser film layer to a transparent state. The second display has a second mode to obscure the transmissive aperture and display an image on the second display via switching the part of the switchable diffuser film layer to a translucent state.

Additional aspects will be apparent to those of ordinary skill in the art in view of the detailed description of various embodiments, which is made with reference to the drawings, a brief description of which is provided below.

BRIEF DESCRIPTION OF THE DRAWINGS

FIG. 7a is an image of the underlying display mode of the switchable transmissive display in FIG. 6a.

FIG. 7b is an image of the full video mode of the switchable transmissive display in FIG. 6a.

FIG. 8b is a top view of the light guide used in the switchable transmissive display in FIG. 8a.

FIG. 8c is a top view of the diffuser sheet used in the switchable transmissive display in FIG. 8a.

FIGS. 11a and 11b are front views of the front and back surfaces of a switchable diffuser film of the display in FIG. 9a using diffuse electrical connection paths on the frames of the apertures.

Figure 1:
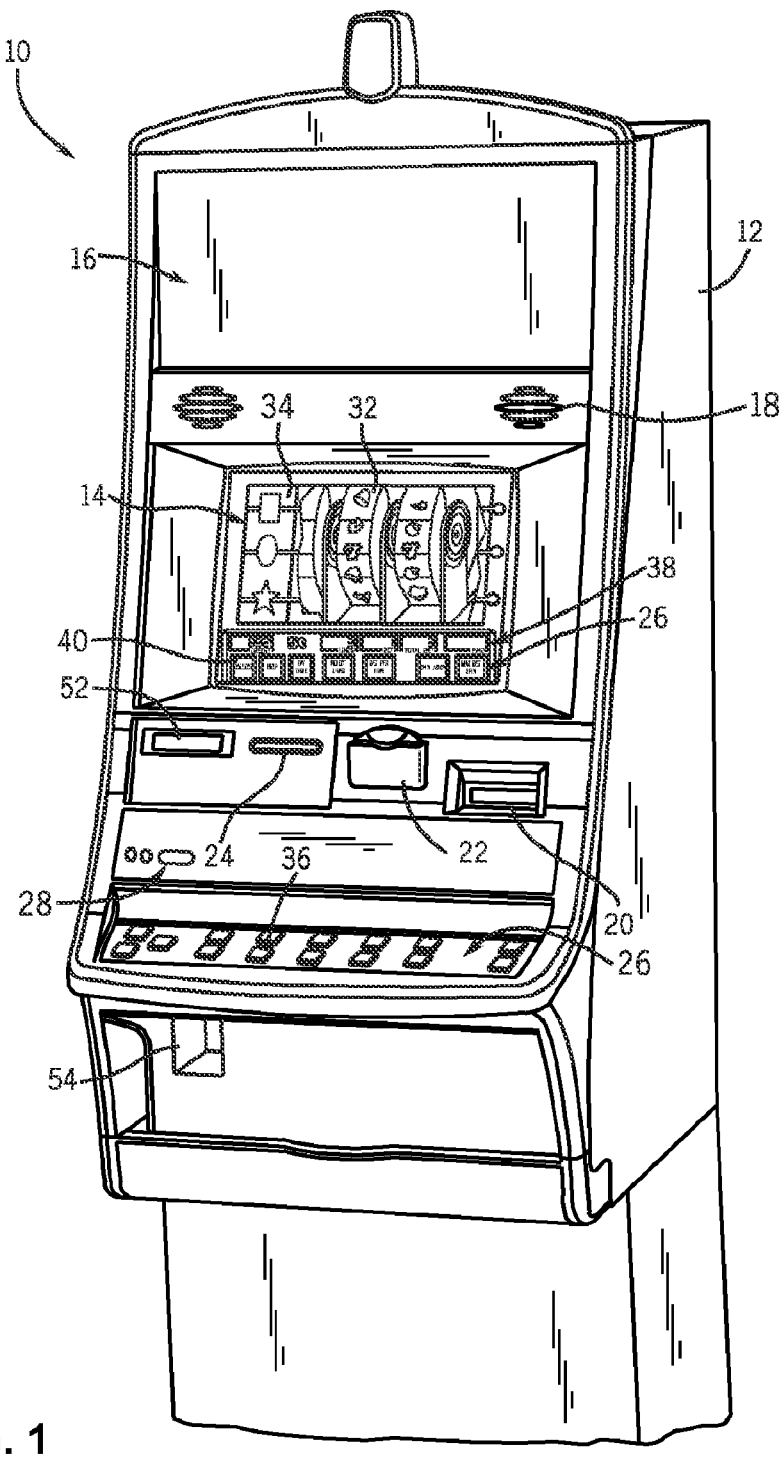
FIG. 1 is a perspective view of a free-standing gaming terminal according to one example.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1b, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, e-mails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. The mechanical reels 32 may be replaced with a simulated mechanical reel display such as those described in U.S. Publication No. 2008/0113755 entitled "Wagering Game With Simulated Mechanical Reels Having An Overlying Image Display," U.S. Publication No. 2008/004104 entitled "Wagering Game With Simulated Mechanical Reels" and U.S. Publication No. 2009-0075721 entitled "Wagering Game With Simulated Mechanical Reels" all of which are incorporated herein by reference in their entirety. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

Figure 2:
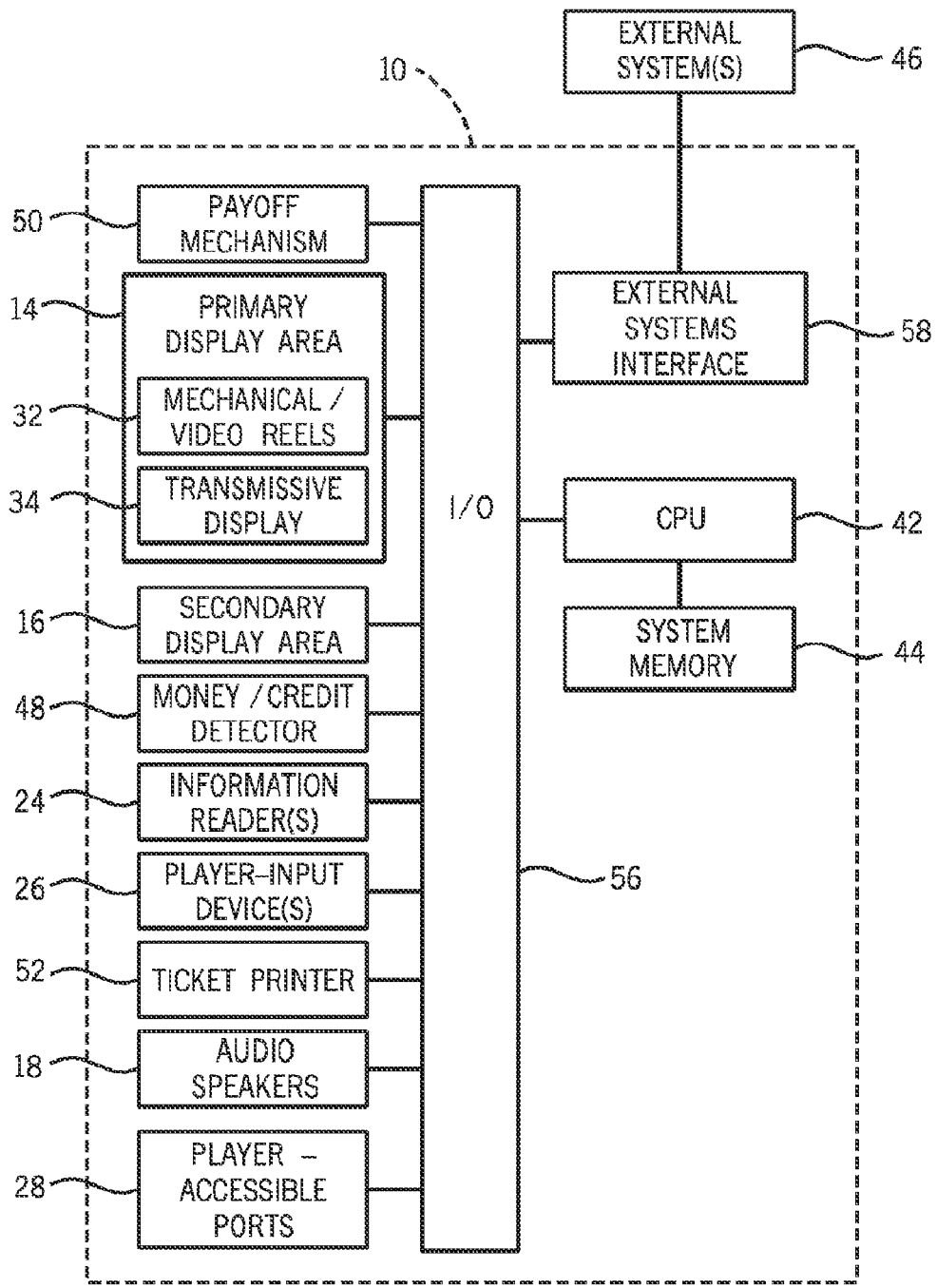
FIG. 2 is a schematic view of a gaming system.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins (from a coin outlet 54 shown in FIG. 1), currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
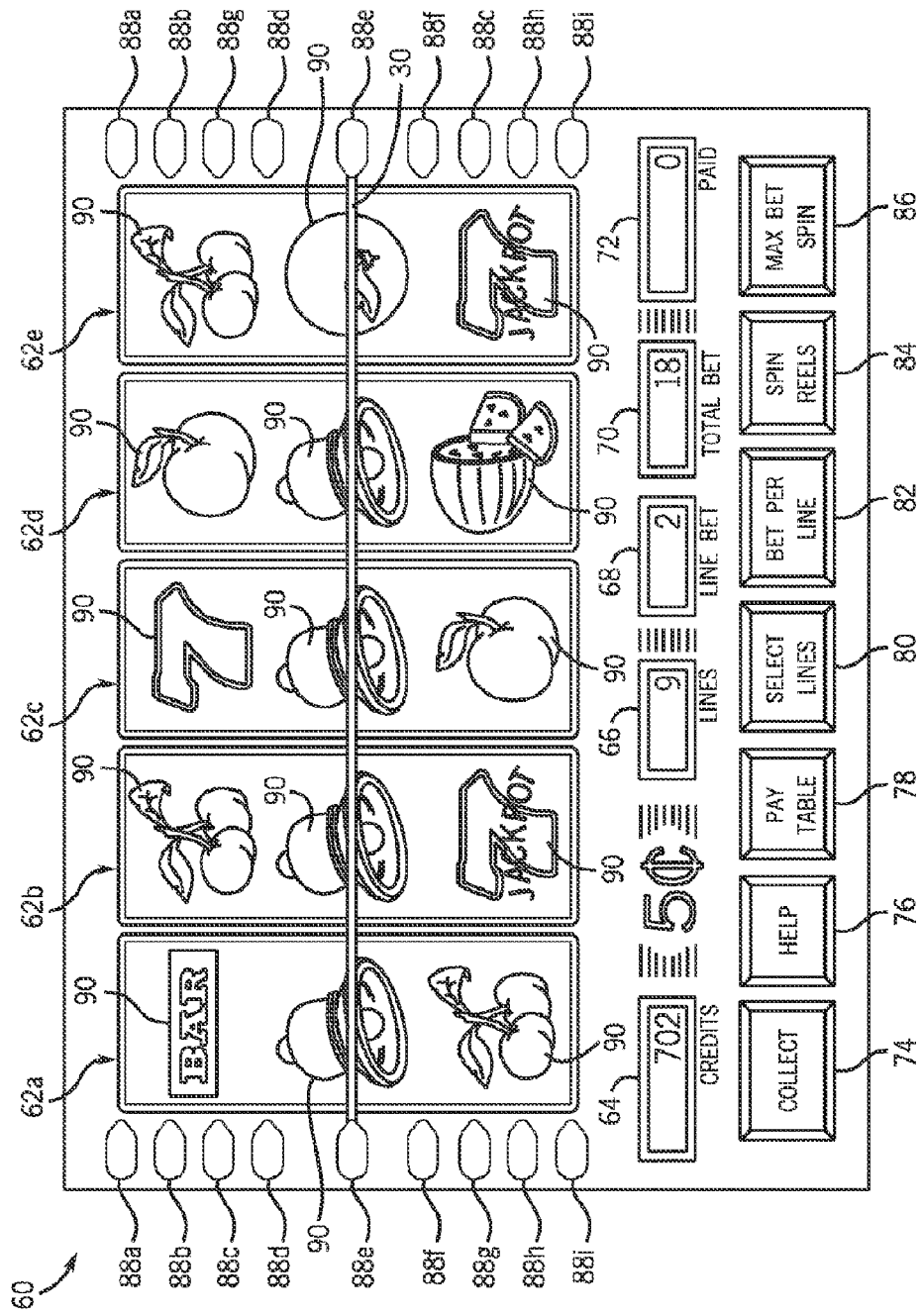
FIG. 3 is an image of a basic-game screen of a wagering game that may be displayed on a gaming terminal.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62a-e. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62a-e; and a "max bet spin" button 86 for wagering a maximum number of credits and moving the reels 62a-e of the basic wagering game. While the gaming terminal 10 allows for these types of player inputs, the present invention does not require them and can be used on gaming terminals having more, less, or different player inputs.

Paylines 30 may extend from one of the payline indicators 88a-i on the left side of the basic-game screen 60 to a corresponding one of the payline indicators 88a-i on the right side of the screen 60. A plurality of symbols 90 is displayed on the plurality of reels 62a-e to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62a-e. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
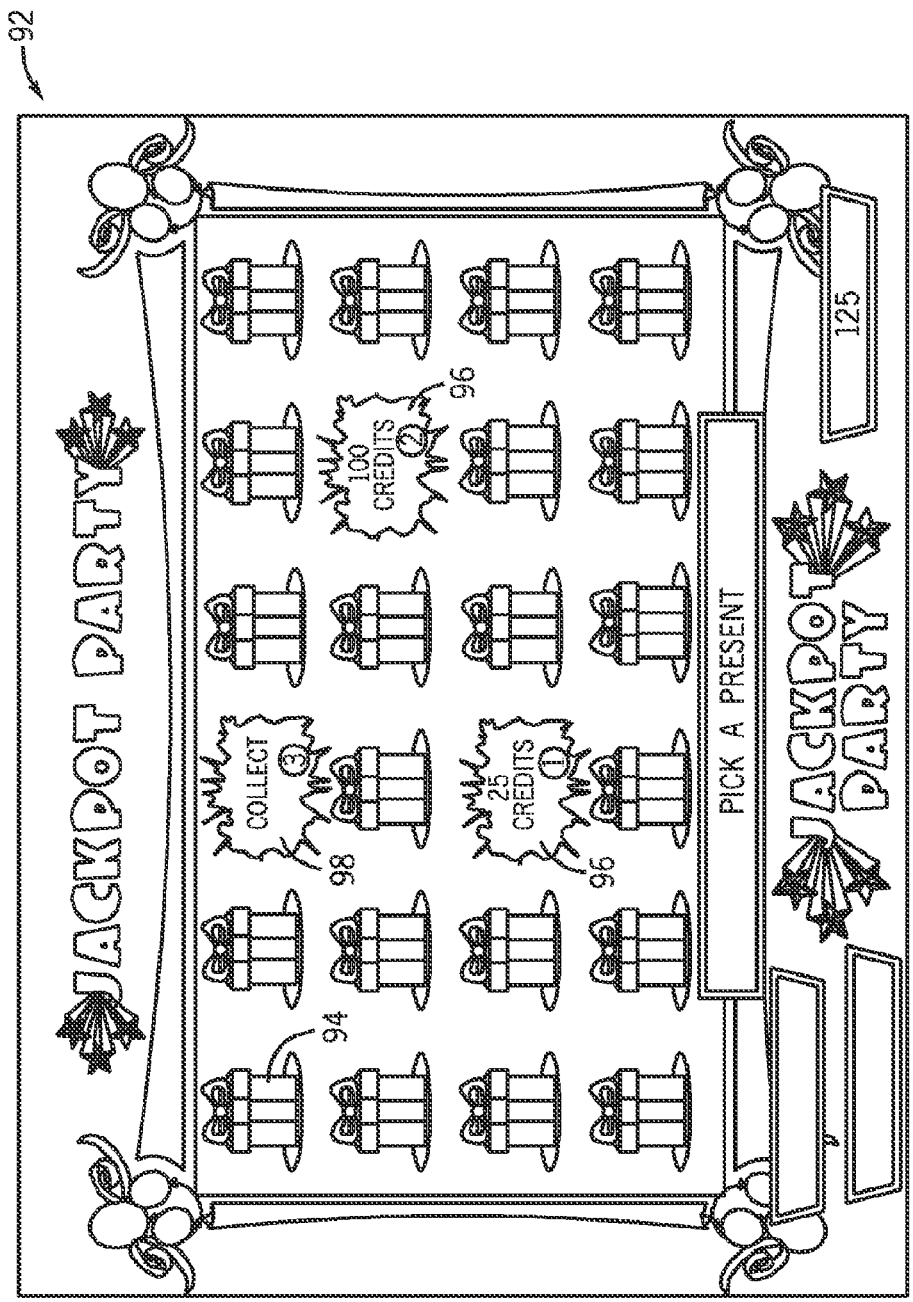
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5A:
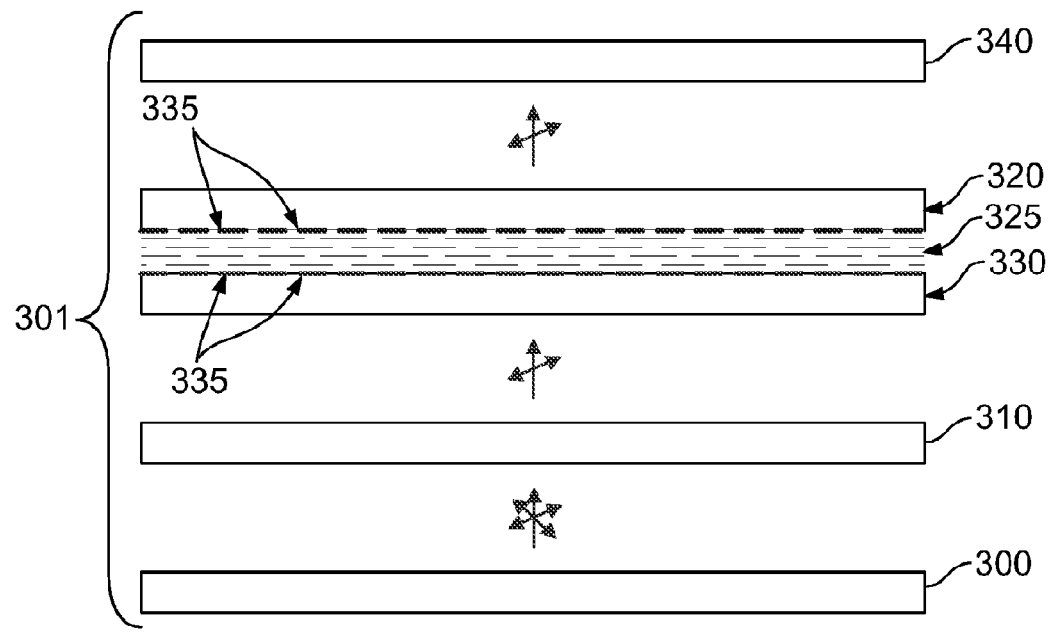
FIGS. 5a-5b are cross-section views of an LCD display and FIG. 5c is an exploded partial isometric view of a touchscreen LCD display.
Figure 5B:
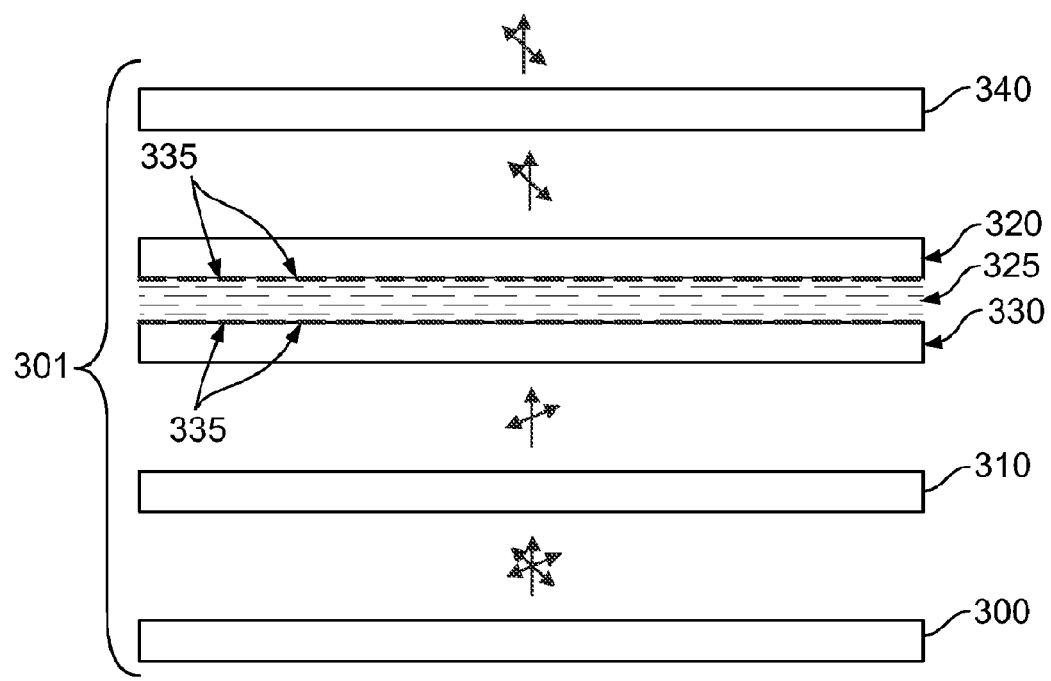

FIGS. 5a-5b are cross-section side views showing a simplified representation of an LCD display 301 that may be used, such as in the primary display 14 or secondary display 16 in FIG. 1 in accord with aspects of the present concepts. Light is output from a backlight 300 which may comprise, but is not limited to, an electroluminescent panel (ELP) or LEDs, OLEDs, incandescent light bulb, cold cathode fluorescent lamp(s) (CCFL), or hot cathode fluorescent lamp(s) (HCFL) used in combination with one or more diffuser elements and/or light guides. Any manner of illumination of the backlight may be employed in combination with the concepts disclosed herein. The light output from the backlight 300 is incident onto the back polarizing film 310 and the light output from the back polarizing film 310 is oriented to a single state of polarization that is perpendicular to that of the front polarizing film 340. The polarized light then passes through a twisted nematic liquid crystal layer 325. The orientation of the liquid crystals in the liquid crystal layer 325 may be selectively controlled by applying a desired voltage to the transparent electrodes 335 disposed on the adjacent glass substrates 320, 330. In particular, the orientation of the liquid crystals in the liquid crystal layer 325 may be selectively controlled to rotate the incoming polarized light 90°. For example as represented by FIG. 5b, when no voltage is applied to the electrodes (an "off" state), the twisted nematic liquid crystal layer 325 may be adapted to rotate the incoming polarized light 90°, so that it is of the same polarization as the front polarizing film and may pass therefore through the front polarizing film 340 (e.g., to form an "on" or "bright" pixel). Conversely as represented by FIG. 5a, when voltage is applied to the electrodes (an "on" state), the twisted nematic liquid crystal layer 325 does not rotate the incoming polarized light and outputs linearly polarized light that is perpendicular to a direction of polarization for the front polarizing film 340 and is correspondingly blocked by the front polarizing film 340 (e.g., to form an "off" or "dark" pixel). Additional layers may also be applied over the front polarizing film 340, such as an anti-glare or anti-reflection film or a hardcoat protective layer.

Although the above description relates to "on" and "off" voltage states of the electrodes controlling the state of the twisted nematic liquid crystal layer 325, intermediate voltages produce intermediate degrees of twist of the twisted nematic liquid crystal layer 325 and accordingly produce a spectrum of grayscale outputs. Accordingly, the twisted nematic liquid crystal layer 325 can be used to create a color display by using a red, green, and blue subpixel for each pixel location, so that a full color spectrum can be displayed for each pixel by varying the amount of these three light primary colors that is visible by varying the voltages applied to each of the three colored subpixels. The varying voltage correspondingly varies the amount of colored light from the backlight of the display panel that reaches the viewer.

The combination of the liquid crystal layer 325, back polarizing film 310 and front polarizing film 340 are, however, associated with a significant absorption loss—up to about 93% in some applications where the system is configured to pass light. Thus, of the light generated by the backlight 300, a significant amount of light is absorbed by the combination of the liquid crystal layer 325, the back polarizing film 310 and the front polarizing film 340 and only about 10% or less of the light eventually reaches the player's eye when the twisted nematic liquid crystal layer 325 is oriented to pass the light output by the rear polarizing film 310. The absorption losses decrease both light transmissivity and the contrast ratio (C/R) (i.e., the ratio of the luminance of the brightest color (white) to that of the darkest color (black) that the system is capable of producing).

Figure 5C:
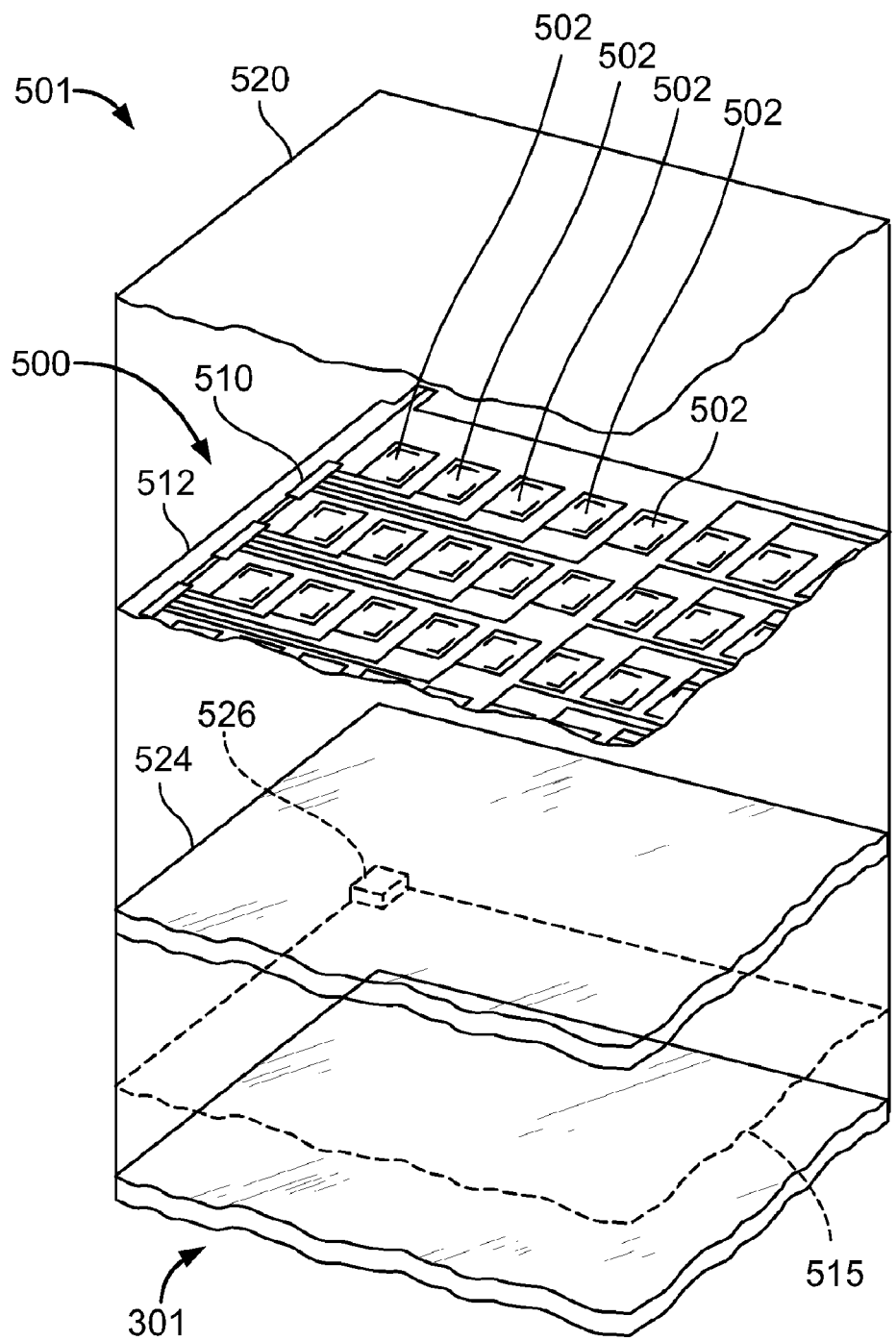

FIG. 5c shows an exploded partial isometric view of a touchscreen LCD device 501 including a touch screen 500 in combination with the LCD display of FIGS. 5a-5b. Transparent capacitive electrodes 502 are arranged in an array across a surface of a transparent substrate 512. Sensor circuits 510 are connected (e.g., serially) to measure the capacitance of each corresponding electrode 502 to which they are connected via traces that are preferably, but not necessarily, translucent. The electrodes 502 advantageously have a size and shape dimensioned to detect an input from a finger. In the illustrated embodiment, individual electrodes 502 measure their own capacitance independent of the other electrodes relative to ground. In another embodiment, the capacitance is measured between two or more electrodes, producing a higher "resolution" of touchpoints as the electrodes can be made smaller and can overlap one another.

The touchscreen 500 overlays a transparent glass or plastic substrate 524, which together overlay the display (e.g., 14, 16), which may comprise, for example, LCD display 301. An optional haptic touchscreen 515 includes actuating devices 526 (such as one near each corner of the haptic touchscreen 515). The actuating devices 526 are selectively actuatable in one or more modes to generate a vibration profile yielding a haptic effect. A protective transparent cover 520 is placed over the transparent substrate 512. Because the electrodes 502 are capacitive-sensing, touches on the protective cover 520 will cause a change in capacitance in the electrodes 502. The outputs of the sensor circuits 510 are coupled to a controller that processes data representing which electrodes 502 measured a change in capacitance. The magnitude of the change represents a pressure. A greater deviation in capacitance represents a greater pressure, and these deviations can be converted by an analog-to-digital converter into numbers representing an amount of pressure. The data can also represent a gesture where multiple electrodes 502 register a touch at various time intervals. The velocity, direction, and acceleration of the gesture can be represented in the data. Other touch sensing technologies could alternatively be utilized, including resistive sensing, surface acoustic wave sensing, pressure sensing, optical sensing, and the like.

Figure 6A:
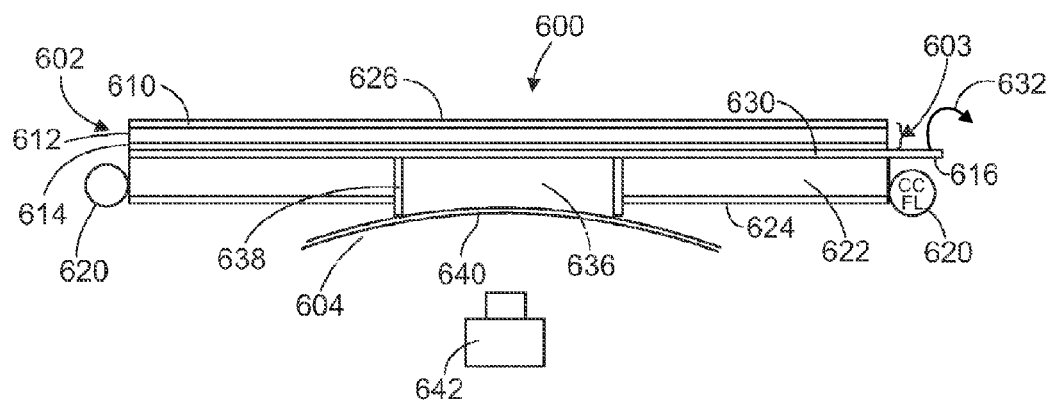
FIG. 6a is a cross-section view of a first example of a switchable transmissive display using a switchable diffuser film.

FIG. 6a is a cross-section view of an example switchable transmissive display 600. The switchable transmissive display 600 includes an overlaying display such as a transmissive LCD panel display 602 similar to the transmissive LCD panel 301 in FIGS. 5a-5b and the transmissive LCD panel 501 in FIG. 5c that is disposed to overlay an underlying display, which is a simulated mechanical reel system 604 in this example. Of course other underlying displays such as an actual mechanical reel, display device or other form of display may be substituted for the simulated mechanical reel system 604. The switchable transmissive display has a full video mode and an underlying display mode. In the full video mode, images may be shown on the transmissive LCD panel display 602 and the underlying display is entirely obscured. In the underlying display mode, at least part of the underlying display such as the simulated mechanical reel system 604 is viewable. Of course other parts of the LCD panel display 602 not superimposed over at least part of the viewable underlying display may be used to display images in the underlying display mode.

The LCD panel display 602 has a front polarizer layer 610, a twisted nematic liquid crystal layer 612, a back polarizer layer 614. A switchable diffuser film layer 616 is located behind the LCD panel display 602. In this example, backlights 620 are cold cathode fluorescent lamps (CCFL) that emit light on an illumination layer 622 that serves as a light guide. As explained above, the backlights 620 may comprise, but are not limited to, an electroluminescent panel (ELP) or LEDs, OLEDs, incandescent light bulb(s), or hot cathode fluorescent lamp(s) (HCFL) used in combination with one or more diffuser elements and/or light guides. The front polarizer layer 610, twisted nematic liquid crystal layer 612 and back polarizer layer 614 make up a transmissive liquid crystal panel 603 for displaying images via control of the liquid crystals in liquid crystal layer 612. The illumination layer 622 is located on an opaque or reflective layer 624 for transmission of maximum light on a video display area 626. As explained above, the light output from the backlights 620 is incident onto the back polarizing film and the light output from the back polarizing film is oriented to a single state of polarization that is perpendicular to that of the front polarizing film of the liquid crystal layer 612. The polarized light passes through the twisted nematic liquid crystal layer 612. The orientation of the liquid crystals in the liquid crystal layer 612 may be selectively controlled by applying a desired voltage to the transparent electrodes. Depending on the orientation of the liquid crystals, the transmissive liquid display panel 603 may display images or be transparent.

The illumination layer 622 in combination with the reflective or opaque layer 624, diffuses and distributes the illumination input from the sides of the illumination layer 622 (from the backlights 620) to ensure uniform illumination of the transmissive LCD panel 602. The backlights 620, illumination layer 622 and reflective layer 624 form a backlight assembly. One or more aligned portions of the illumination layer 622 and the reflective or opaque layer 624 are removed in the transmissive region(s) of the liquid crystal display assembly to form one or more apertures or windows 636. The apertures 636 allow the underlying display such as the simulated mechanical reel system 604, or other object or device (e.g., a display device such as a LED display, TFT LCD display, plasma display panel (PDP), etc.), to be viewed. The apertures 636 are bounded by optional frames 638. Alternatively, in lieu of the act of removal of a portion of the illumination layer 622 and reflective or opaque layer 624, such as by a post-manufacture cutting or etching process, the illumination layer 622 may be formed with the aperture or window 636 during manufacture, with the reflective or opaque layer being applied on the remainder of the illumination layer.

The switchable diffuser film layer 616 includes another liquid crystal layer 630 and is located between the transmissive LCD panel 602 and the illumination layer 622 of the backlight assembly. In this example, the switchable diffuser film layer 616 is in direct contact with the back polarizer layer 614 of the transmissive LCD panel 602. The switchable diffuser film layer 616 normally has a diffuse, milky appearance in a translucent state. When the proper voltage is applied from one surface to the other of the switchable diffuser film layer 616 via an electrical input 632, the crystals of the liquid crystal layer 630 in the switchable diffuser film layer 616 line up perpendicular to the surface. This causes the switchable diffuser film layer 616 to take on a transparent state. Examples of switchable films for the switchable diffuser film layer 616 are available from Pro Display Ltd. of Wakefield, UK or LC-TEC Displays AB, Borlänge, Sweden. When the switchable diffuser film layer 616 is in the transparent state, the apertures 636 allow viewing of the underlying display such as the simulated mechanical reel system 604 through the illumination layer 622 and reflective layer 624.

The simulated mechanical reel system 604 includes a curved screen 640 and a video display device such as a projector or projectors 642. The curved screen 640 has a radius of curvature that is similar to the radius of curvature of a mechanical reel used within a mechanical-reel style of gaming machine 10 (e.g., four inches to seven inches). The curved screen 640 may be semi-transparent or semi-transparent for only certain wavelengths of light, such as various polymeric materials.

The video display device is a projection device that transmits and projects images onto the screen 640. In this example, the video display device includes projectors 642 that each include red, green and blue lights which are LEDs. The projectors 642 sequentially turn on red, green, and blue LEDs to create sequential images, which the eye blends into a full-color image. Each color LED is on for less than 33% of the time (there is a blanking interval) when the projector projects an image for the underlying display.

Alternatively, the video display device may be an LCD projection device or a DLP projection device that creates images on the screen 640. Other examples of a video display device may include traditional projection technologies or other systems, such as liquid crystal on silicon (LCoS) technology, heads-up display (HUD), light pipe displays, fiber optic displays and laser projection displays (e.g., a three-colored laser). The images produced by the video display device are dynamic images that move in a manner that is similar to the movement of symbols on a mechanical reel. Accordingly, the images include a plurality of symbols used for indicating the randomly selected outcome of the wagering game. From the player's perspective, these images appear to be symbols rotating on a mechanical reel having a radius of curvature equivalent to the radius of curvature of the screen 640. In certain examples, the images can be a high-resolution output, such as an 800×600 pixel display, or greater, or other suitable resolution that would be considered high-resolution to those familiar with the field of disclosure.

The video display device may project images onto the inside surface of the screen 640 (that is, rear projection) as illustrated for example in FIG. 6a. Alternatively, the video display device may project images on an outside surface of the screen 640 (that is, front projection). Using mirrors or other optical devices, the projectors may be placed in areas not directly in alignment with the screen 640.

Multiple projectors 642 may be used to produce three or five simulated mechanical reels. As such, the underlying display 604 would appear as a three-reel slot machine or a five-reel slot machine. Alternatively, the video display device may have a single projector that allows it to provide images for more than one (or all) of the simulated mechanical reels. In certain embodiments, strobe projection using a single video display device may be used. The video display device may sequentially output multiple image signals onto respective multiple transparent layers using frequency cycles greater than can be perceived by the human eye. In other examples, images can be projected from the side of a series of reels using sequential mirrors within the reels to split the signal projected from the video display device.

The projection distance from the video display device to the screen 640 may vary based on a number of factors including focal length, mechanical limitations, spatial limitations, lensing abilities and other factors that depend on the type of video display device, the type of transparent surface and the type of reel being used.

The transmissive LCD panel 602 remains operational, and is able to superimpose graphics over the underlying display such as the simulated mechanical reel system 604 which is no longer visible through the transmissive LCD panel 602 in the full video mode. Switching from the full video mode to the underlying display mode allows both presentation of computer graphics or video and direct viewing of an underlying display device disposed behind the transmissive LCD panel 602 via the apertures 636 in FIG. 6a. In some aspects, the underlying display is disposed directly behind the apertures 636, whereas in other aspects, the underlying display may be disposed anywhere behind the transmissive LCD panel 602 (i.e., not directly behind the transmissive LCD panel) where it can be viewed (e.g., obliquely) through the apertures 636.

This switchable appearance of the switchable diffuser film layer 616 is the basis for switching modes from the full video mode to the underlying display mode of the switchable transmissive display 600 to create the effects shown in FIGS. 7a-7b below. The switchable diffuser film layer 616 is located between the backlight assembly (backlights 620, illumination layer 622 and reflective layer 624) and the liquid crystal panel 603. When voltage is applied to the switchable diffuser film layer 616, the switchable diffuser film layer 616 takes on a transparent appearance over the apertures 636 allowing the viewing of the underlying display such as the simulated mechanical reel system 604. Images may still be displayed on the transmissive LCD panel display 602 in areas other than those over the apertures 636. The video mode of the switchable transmissive display 600 is activated by cutting off the voltage to the switchable diffuser film layer 616. When voltage is cut off, the switchable diffuser film layer 616 returns to its diffuse appearance obscuring the apertures 636. Since the entire switchable diffuser film layer 616 changes from clear to diffuse including the areas corresponding to the apertures 636, the switchable diffuser film layer 616 evens out the distribution of light from the illumination layer 622 to the display panel 603 while the switchable transmissive display 600 is in the video mode. An optional permanent diffuser sheet (not shown) may be located on the illumination layer 622 of the backlight assembly. Such an optional permanent diffuser sheet has corresponding apertures to the apertures 636 and assists in diffusing light from the backlights 620 evenly to the transmissive LCD display 602 in either mode.

The switchable diffuser film layer 616 is not perfectly transparent when on, or perfectly diffuse when off. About 90% of the light goes through the switchable diffuser film layer 616 (in either state) in this example. There is some loss of brightness in the video display area 626 in the full video mode, and some loss of clarity of the underlying display in the mechanical reel mode due to the switchable diffuser film layer 616.

Since the underlying display in this example is a projector based display, the projector or projectors 642 may be used for at least part of a supplemental backlight for the transmissive LCD panel 602 in full video mode. The projectors 642 may also be used to enhance the backlights 620 to compensate for the loss of light from the switchable diffuser film layer 616. Since each projector 642 includes red, green, and blue LEDs, to create the maximum white light, all three LEDs may be turned on continuously, which may create more than three times the white light to augment the backlights 620. The hue, or color tint, on the backlights 620 from the projector 642 may be adjusted by adjusting the relative brightness of the red, green, and blue LEDs. This could be done to compensate for any color change introduced by the switchable film diffuser 616. Further, since not all of the light from the LEDs ends up leaving the projector 642, light wasted in various optical paths that are only required for projection may be diverted by providing an alternate optical path and a motorized steering mirror to switch between the optical paths and improve the white light brightness in non-projection mode.

Figure 6B:
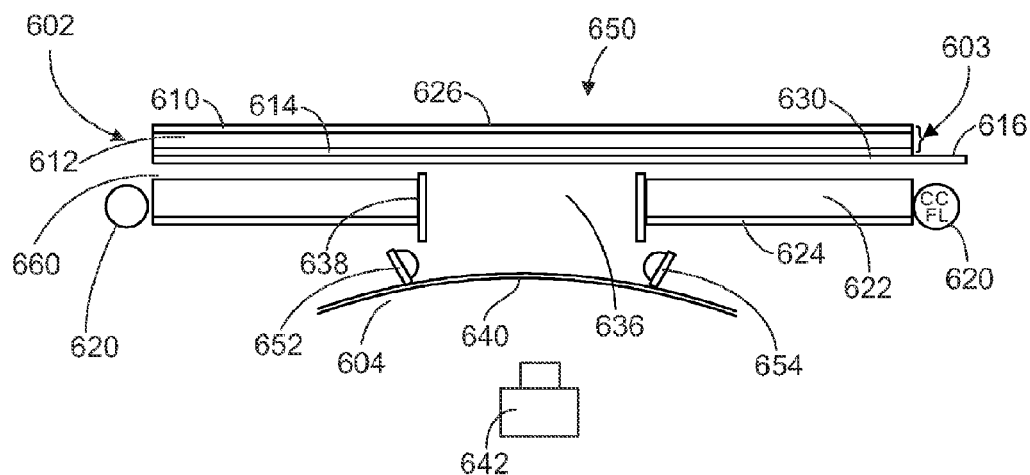
FIG. 6b is a cross-section view of a variation of the first example of the switchable transmissive display in FIG. 6a having additional backlighting.

FIG. 6b is a cross-section view of an alterative switchable transmissive display 650 to the switchable transmissive display 600 in FIG. 6A where identical elements have identical element numbers. The alternative switchable transmissive display 650 has additional lighting elements to compensate for the loss of light from the switchable diffuser film layer 616. As may be seen in FIG. 6b, the apertures 636 are lit to ensure even lighting in the transmissive display 650. The lighting is provided by strategically placed white light emitting diode (LED) banks 652 and 654 serving as a supplemental backlight mounted relative to the apertures 636. Alternatively, the white LED banks 652 and 654 may be composed of red, green, and blue (RGB) LEDs to further enhance colors (including white) on the video display area 626 by cycling the RGB LEDs sequentially or by providing white light by powering the RGB LEDs simultaneously. The white LED banks 652 and 654 are mounted where they do not obstruct the light from the backlights 620 to the LCD panel 602. The white LED banks 652 and 654 may include reflectors, diffusers, or other means to concentrate and distribute their light to the proper locations.

Even backlighting of the front LCD panel 602 requires balancing the brightness, and color of the light from the backlight 620 and the LED banks 652 and 654 that form the LCD backlight apparatus versus the diffused light through the switchable diffuser film layer 616. The addition of supplemental lighting in the form of the LED banks 652 and 654 to rear-illuminate the apertures 636 when the switchable diffuser film layer 616 is translucent are used to provide substantially homogenous light intensity across the back of the front LCD panel 602 in this example. The LED banks 652 and 654 are switched on by a controller such as the controller 42 in FIG. 2 when using the front LCD panel 602 as a single video display in the full video mode. In addition, a space 660 is created between the illumination layer 622 and the LCD panel 602 to improve the diffusion at the transition zone where the LCD panel 602 may show a border at the edge of the apertures 636. Of course, using the projector or projectors 642 as explained above may further enhance the backlighting of the front LCD panel 602 in addition to the LED banks 652 and 654.

Alternatively, a curved section of the same material as that in the switchable diffuser film layer 616 may be used on the curved screen 640 for the projected reels as the underlying display system 604. This allows the screen to be made transparent when in video mode and allows the projector or projectors to provide more light for better illumination of the diffuser switchable film in the apertures 636 in the underlying display mode.

Figure 7A:
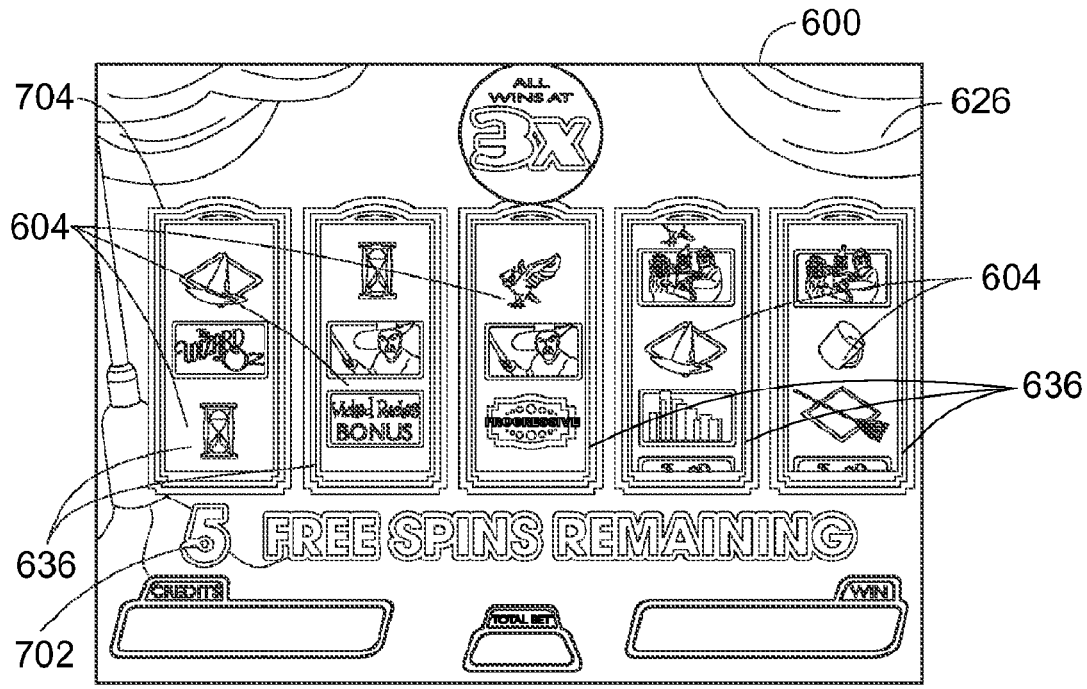

As shown in the image in FIG. 7a, the switchable transmissive display 600 in FIG. 6a is in the underlying display mode exposing the apertures 636. FIG. 7a shows a video image 702 and the underlying display such as the simulated mechanical reel system 604 which are viewed through the apertures 636 in the illumination layer 622 and the reflective layer 624 shown in FIG. 6a in an area 704 in FIG. 7a. FIG. 7b is an image showing the switchable transmissive display 600 in the full video mode. In the example in FIG. 7b, the background image 702 from FIG. 7a remains, but the underlying display (simulated mechanical reel system 604) has been entirely obscured allowing the use of the entire area of the video display area 626 of the transmissive LCD panel 602. In this example, the foreground area 704 previously showing the simulated mechanical reel system 604 in FIG. 7a now displays a bonus game image 706 allowing a player to select player-selectable elements 708.

The superimposed video image presented on the transmissive LCD panel 602 may serve any number of other functions. For example, the video image presented on the transmissive LCD panel 602 may be used to highlight winning combination(s) (e.g., "7," "7," "7"), associated pay line(s,) and/or depict the award for that winning combination on an underlying display such as the simulated mechanical reel system 604. Alternatively, the video image may obscure all symbols not appearing on an active pay line or not part of a winning outcome. The video image may further include special effects such as flashing the winning pay line(s) and/or the award and providing desired themed graphics in the mechanical reel mode. In embodiments of a transmissive LCD panel 602 outfitted with a touch screen, the video image on the transmissive LCD panel 602 portrays touch keys wherein a player can then enable a desired function by touching the touch screen at an appropriate touch key. Thus, the superimposed video image, along with a touch screen, may be used to implement side betting, such as is disclosed in U.S. Patent Publication No. 2004/0219968 entitled "Gaming Machine with Interactive Pop-Up Windows," which is hereby incorporated by reference in its entirety herein. In some embodiments, the superimposed video image may provide a foreground image that interacts with a background image on the primary display. The superimposed video image may be used to provide additional games instead of or in addition to interacting with a wagering game display on a primary game display.

Figure 7B:
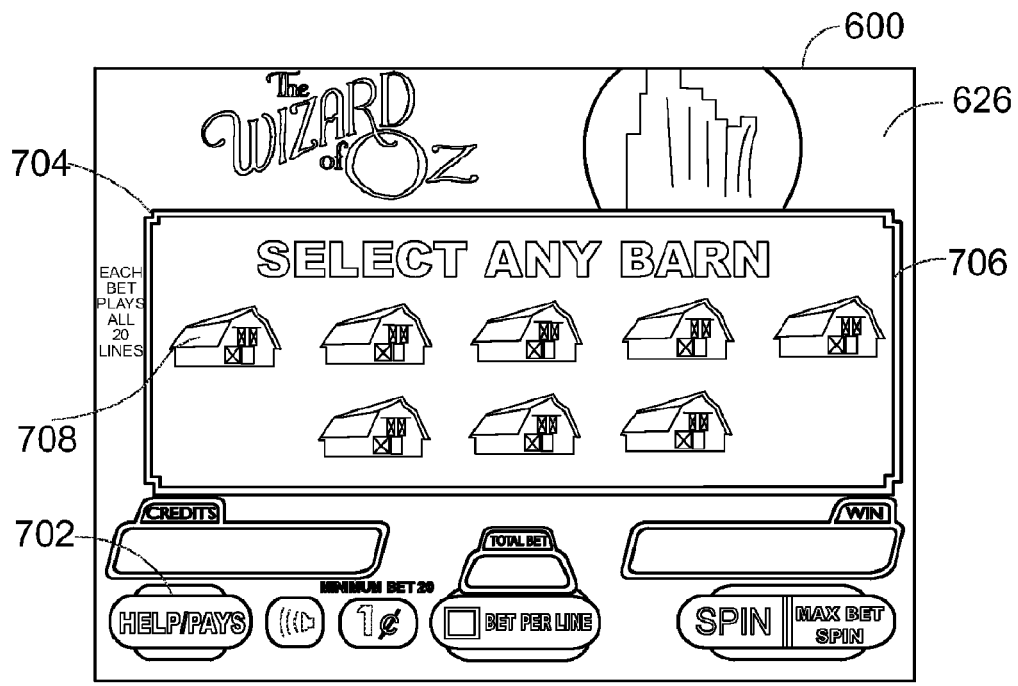

Basic wagering games and/or bonus games may also be played, in whole or in part, using the superimposed video image on the transmissive LCD panel 602 as shown in FIG. 7b. Further, the video image may be used to modify one or more symbols printed on one or more of the stopped mechanical reels or to display a symbol over a blank symbol field (i.e., solid white area) on an underlying mechanical reel, simulated reel, or other random outcome display device.

Although FIGS. 7a-7b and the examples discussed above relate to use of the modes of the switchable transmissive display 600 for the same game, the use of the switchable transmissive display 600 may be used for other purposes. For example, the switchable transmissive display 600 may be set in the full video mode for a game that is exclusively video based. The same transmissive display 600 may be switched to the underlying display mode for playing a different game on the same terminal. The switching between full video and underlying display modes may be performed remotely for an individual gaming terminal or bank of terminals.

Figure 8A:
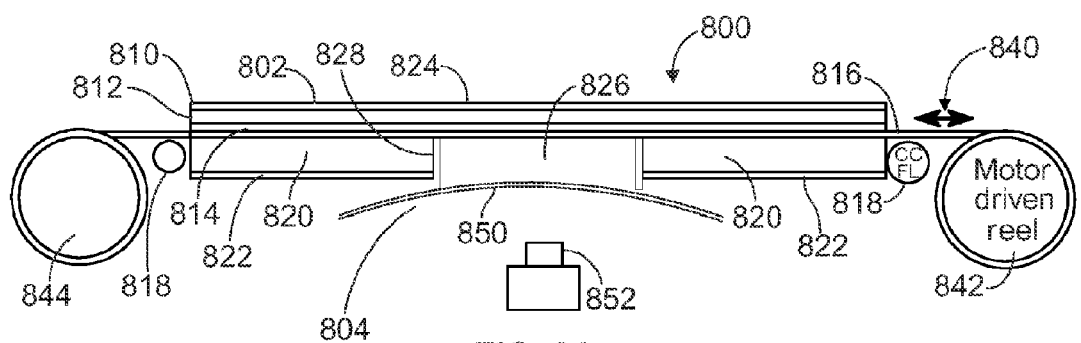
FIG. 8a is a cross-section view of a second example of a switchable transmissive display.

FIG. 8a is a cross-section view of a second example of a switchable transmissive display 800. The switchable transmissive display 800 includes an overlaying display such as a transmissive LCD panel 802 similar to the transmissive LCD panel 301 in FIGS. 5a-5b and the transmissive LCD panel 501 in FIG. 5c that is positioned over an underlying display, which is a simulated mechanical reel system 804 in this example. The simulated mechanical reel system 804 includes a curved screen 850 and a projector 852. Of course other underlying displays such as an actual mechanical reel, display device or other form of display may be substituted for the simulated mechanical reel system 804.

The transmissive LCD panel 802 includes several layers including a front polarizer layer 810, a twisted nematic liquid crystal layer 812, a back polarizer layer 814 and a flexible diffuser sheet 816. In this example, backlights 818 are a cold cathode fluorescent lamp(s) (CCFL) that emits light on an illumination layer 820 that serves as a light guide. The illumination layer 820 is located on an opaque or reflective layer 822 for transmission of maximum light on a video display area 824. The backlights 818, illumination layer 822 and reflective layer 822 form a backlight assembly. As explained above, the light output from the backlights 818 is incident onto the back polarizing layer 814 and the light output from the back polarizing layer 814 is oriented to a single state of polarization that is perpendicular to that of the front polarizing layer 810 of the LCD panel 802. The polarized light passes through the twisted nematic liquid crystal layer 812. The orientation of the liquid crystals in the liquid crystal layer 812 may be selectively controlled by applying a desired voltage to the transparent electrodes.

Figure 8B:
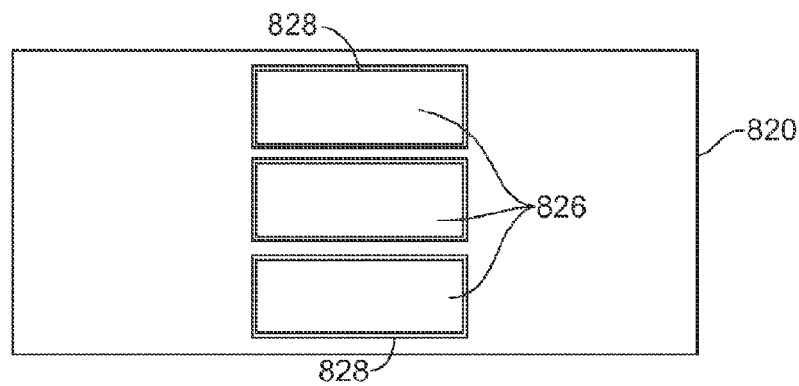

The illumination layer 820, in combination with the reflective or opaque layer 822, diffuses and distributes the illumination input from the sides of the illumination layer 820 (from the backlights 818) to ensure uniform illumination of the transmissive LCD panel 802. One or more aligned portions of the illumination layer 820 and the reflective or opaque layer 822 are removed in the transmissive region(s) of the liquid crystal display assembly to form one or more apertures or windows 826 as shown in FIGS. 8a and 8b. The apertures 826 allow the underlying display such as the simulated mechanical reel system 804 to be viewed. The apertures 826 are bounded by optional frames 828. Alternatively, in lieu of the act of removal of a portion of the illumination layer 820 and reflective or opaque layer 822, such as by a post-manufacture cutting or etching process, the illumination layer 820 may be formed with the aperture or window 826 during manufacture, with the reflective or opaque layer being applied on the remainder of the illumination layer.

Figure 8C:
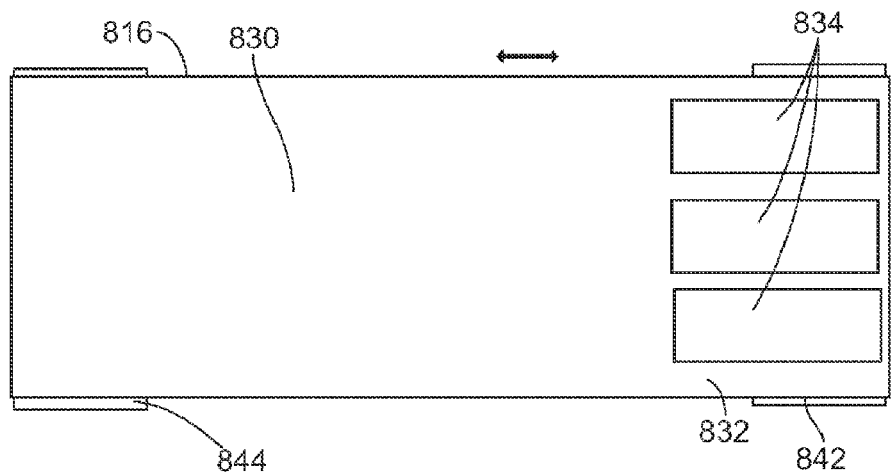

FIG. 8c is a top view of the diffuser sheet 816 of the switchable transmissive display 800 in FIG. 8a. The diffuser sheet 816 has a solid region 830 and an aperture region 832 having a series of diffuser apertures 834 which allow visual access to the underlying display such as the simulated mechanical reel system 804. Alternatively, the diffuser apertures 834 could be constructed by polishing the base diffuser material (or treating it chemically) in the aperture area 834 to render it transparent. Also the diffuser sheet 816 may be created with a transparent base material, then abrading it (chemically treated) in the diffuse areas 830 to render the material translucent everywhere but the apertures 834. In either of these alternative fabrications, no physical cutouts would be required for the apertures 834. When the diffuser apertures 834 in the diffuser sheet 816 are aligned with the apertures 826 of the illumination layer 820, an underlying display such as the simulated mechanical reel system 804 may be easily seen by a player through the transmissive LCD panel 802. The switchable transmissive display 800 is in the underlying display mode when the apertures 834 and 826 are aligned. The switchable transmissive display 800 is in the video mode when the diffuser apertures 834 of the diffuser sheet 816 are moved out of alignment of the apertures 826 and the solid region 830 is moved over the apertures 826.

The transmissive LCD panel 802 remains operational, and is able to superimpose graphics over the underlying display (such as the simulated mechanical reel system 804) which is no longer visible through the transmissive LCD panel 802 in the full video mode. As noted above, switching between the full video and underlying display modes allows both presentation of computer graphics or video and direct viewing of an underlying display device disposed behind the transmissive LCD panel 802 via the apertures 826 in FIGS. 8a and 8b.

As explained above, the apertures 834 (or alternatively full transparent areas) are cut in the diffuser sheet 816 to allow transmission of light to the underlying simulated mechanical reel system 804 through the apertures 826. The diffuser sheet 816 is moved to align the apertures 834 over the apertures 826 when it is desired in the underlying display mode. The diffuser sheet 816 serves to diffuse all the light in the parts of the front display area 824 that surround the apertures 826 when the apertures region 832 is moved into place over the apertures 826. The diffuser sheet 816 serves to diffuse all the light in the entire front display area 824 when the solid region 830 is moved into place. In this example, a motorized system 840 including mechanical spools 842 and 844 moves the diffuser sheet 816. The mechanical spools 842 and 844 are rotated by a motor (not shown) to slide the diffuser sheet 816 to align the apertures 834 with the apertures 826 in the mechanical reel mode and move the solid region 830 to cover the apertures 836 entirely in the full video mode. When in full video mode the motor rotates the spools 842 and 844 and slides the apertures 834 of the aperture portion 832 of the diffuser sheet 816 completely out of position over the apertures 826, in which the entire area is covered by the diffuser material of the diffuser sheet 816. Since the entire viewable area of the transmissive LCD panel 802 is covered by the diffuser sheet 816, all of the light from the backlights 818 is diffused to the entirety of the front display area 824 of the transmissive LCD panel 802 in the full video mode. If desired, different numbers of apertures may be cut into the diffuser sheet 816 to provide different numbers of reels or simulated reels in the underlying display depending on which part of the diffuser sheet 816 is moved over the underlying display.

Figure 9A:
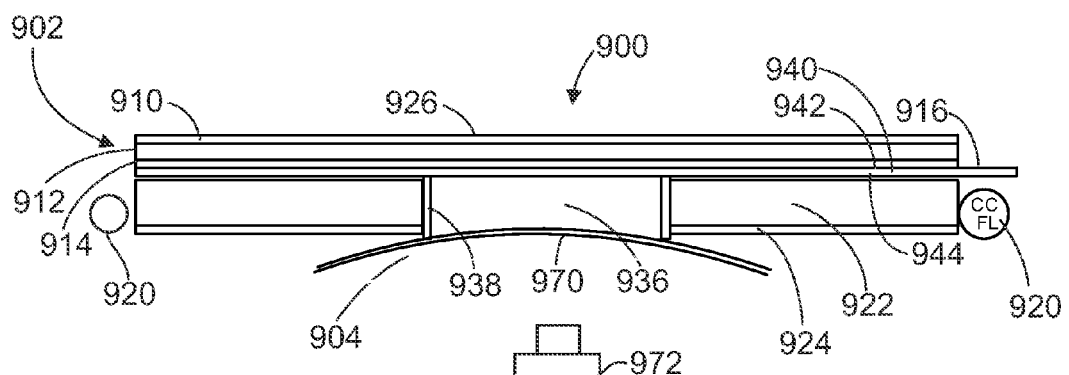
FIG. 9a is a cross-section view of a third example of a switchable transmissive display using a switchable diffuser film.

FIG. 9a is a cross-section view showing an alternative switchable transmissive display 900 that uses a switchable diffuser layer where only the areas of the switchable diffuser layer over the reel apertures change state (and the remaining areas stay diffuse) when the mechanical reel mode is activated. Such an alternative allows individual control of showing or obscuring each aperture. As will be explained below, individual control of obscuring a certain area allows for a transmissive display for a five reel game to be converted to a three reel game via electronic control. Of course other numbers of apertures for different numbers of reels may be used.

FIG. 9a shows a cross-section view of the switchable transmissive display 900. The switchable transmissive display 900 has an overlaid display such as a transmissive LCD panel 902 and an underlying display which is a simulated mechanical slot reel system 904 in this example. The simulated mechanical reel system 904 includes a curved screen 970 and a projector 972. The LCD panel 902 has a front polarizer layer 910, a twisted nematic liquid crystal layer 912, a back polarizer layer 914 and a switchable liquid crystal (LC) diffuser film layer 916. In this example, a backlight 920 is a cold cathode fluorescent lamp(s) (CCFL) that emits light on an illumination layer 922. The illumination layer 922 serves as a light guide and is located on an opaque or reflective layer 924 for transmission of maximum light on a video display area 926. As in the previous examples, the backlight 920, the illumination layer 922 and reflective layer 924 form a backlight assembly having apertures 936 formed therethrough that are bounded by optional frames 938 that allow viewing of the underlying display such as the mechanical reel 904 through the illumination layer 922 and reflective layer 924.

Figure 9B:
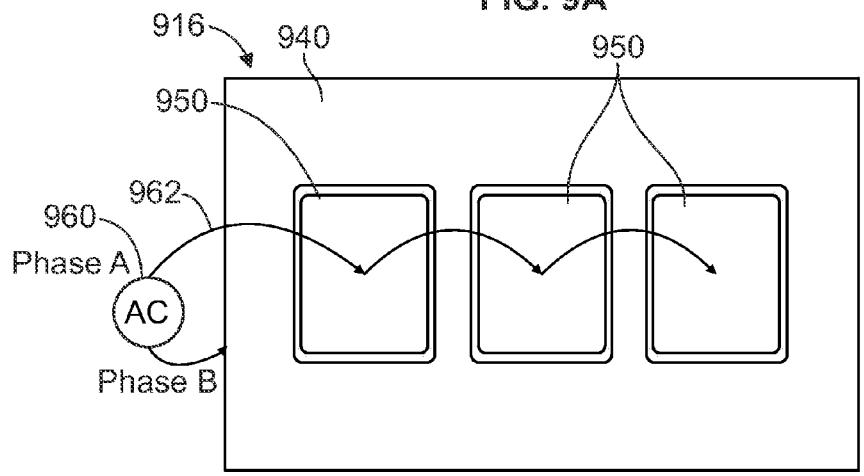
FIGS. 9b and 9c are front views of the front and back sides of the surfaces of a diffuser film layer of the display in FIG. 9a using direct electrical connections.
Figure 9C:
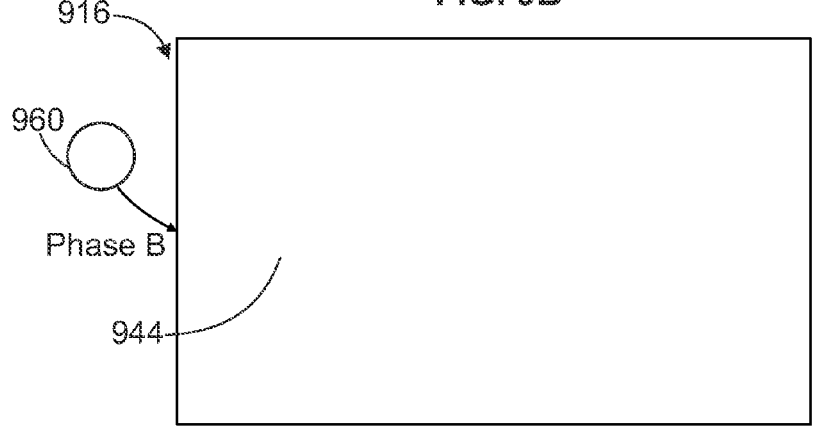

The switchable diffuser film layer 916 includes a top layer 940, a liquid crystal layer 942 and a bottom layer 944. FIG. 9b shows a front view of the top layer 940 of the switchable diffuser film layer 916 and FIG. 9c shows a front view of the bottom layer 944 of the switchable diffuser film layer 916. The top layer 940 includes aperture areas 950 which may be switched between a state to cause the liquid crystal layer to diffuse light and a state for the liquid crystal layer to allow light transmission. The switchable diffuser film layer 916 requires that the diffuser switch from translucent to transparent in the aperture areas 950. The areas other than the aperture areas 950 stay in the same state all the time. In this example, the other areas remain translucent, but the other areas could be set to be transparent. If the areas outside the aperture areas 950 stay transparent, a supplementary diffuser sheet is required to diffuse the light in those areas as explained above.

The switchable diffuser film layer 916 changes state by the application of an AC voltage to the opposite sides of the LC film. This makes the crystals line up perpendicular to the surfaces of the switchable diffuser film layer 916. To make only the aperture areas 950 switch modes, it is necessary to switch the voltage applied to only the aperture areas 950 of the LC material of the switchable diffuser film layer 916. In this example, an AC voltage source 960 is coupled to the front and back layers 940 and 944. Voltage in phase A is applied to the aperture areas 950 of the front layer 940 while voltage in phase B is applied to the entire area of the back layer 944. Since the voltage to the aperture areas 950 are opposite, the crystals in the switchable diffuser film layer 916 are transparent in the aperture areas 950. The remaining areas in the front layer 940 remain opaque because the voltage in these areas is in the same phase.

The electrical connections to the aperture areas 950 of the switchable diffuser film layer 916 by transparent electrical connections 962 affixed above the unaffected sections of the front layer 940 in this example. The transparent electrical connections 962 enable the aperture areas 950 of the switchable diffuser film layer 916 to be turned transparent via electrical signals (in opposite phases) without changing the transmissivity of the remainder of the area of the front layer 940.

Figure 10A:
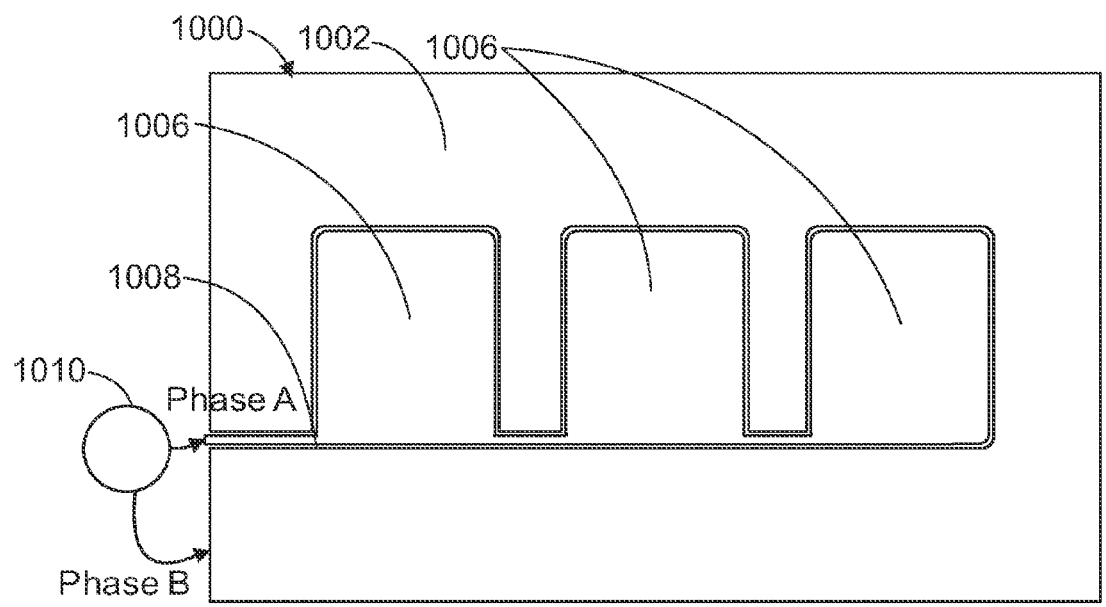
FIGS. 10a and 11b are front views of the front and back surfaces of a switchable diffuser film of the display in FIG. 9a using electrical connections on the frames of the apertures.
Figure 10B:
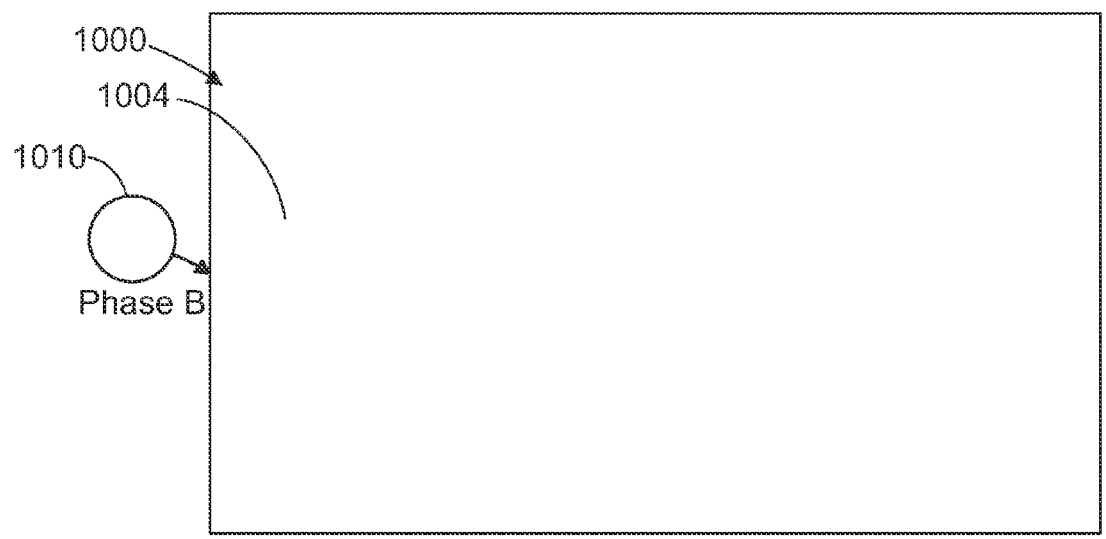

FIG. 10a-10b are front views showing the front and back surfaces respectively of a switchable liquid crystal diffuser layer 1000 that may be substituted for the switchable diffuser film layer 916 in FIG. 9a-c. The switchable diffuser film layer 1000 includes a front layer 1002 shown in FIG. 10a and a back layer 1004 shown in FIG. 10b. A series of aperture areas 1006 is formed on the front layer 1002. FIGS. 10a-10b demonstrate another approach to make narrow connections such as the electrical connection arm 1008 from the aperture areas 1006 above the front layer 1002 to an edge of the sheet as shown in FIG. 10a in order to be coupled to a voltage source 1010. As with the previous example, voltage in phase A is applied to the aperture areas 1006 and the electrical connection arm 1008 of the front layer 1002 while voltage in phase B is applied to the entire area of the back layer 1004. Since the voltage to the aperture areas 1006 are opposite, the crystals in the diffuser film layer 1000 make the aperture areas 1006 transparent, while the remaining areas in the front layer 1002 remain opaque because the voltage in these areas are in the same phase.

The small areas (connection arms 1008) at the bottom of the aperture area 1006 are much narrower to minimize visibility. The translucency of this small area under the electrical connection arm 1008 may be maintained with a matching small strip of diffusing film (not shown) over the area between the reel windows.

Figure 11A:
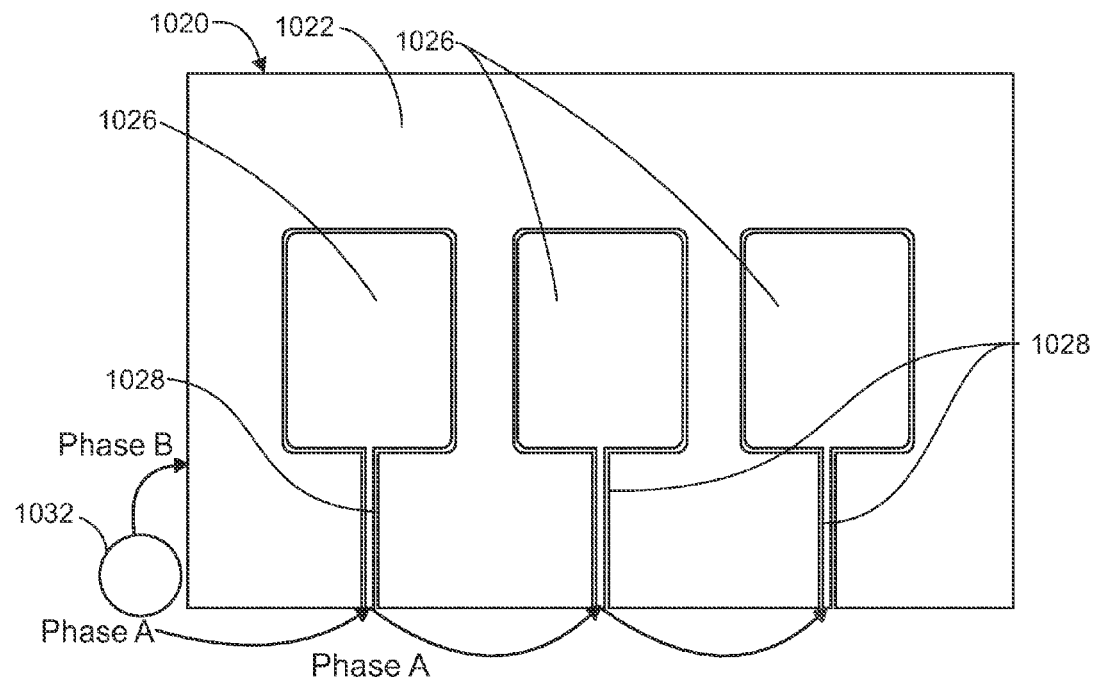
Figure 11B:
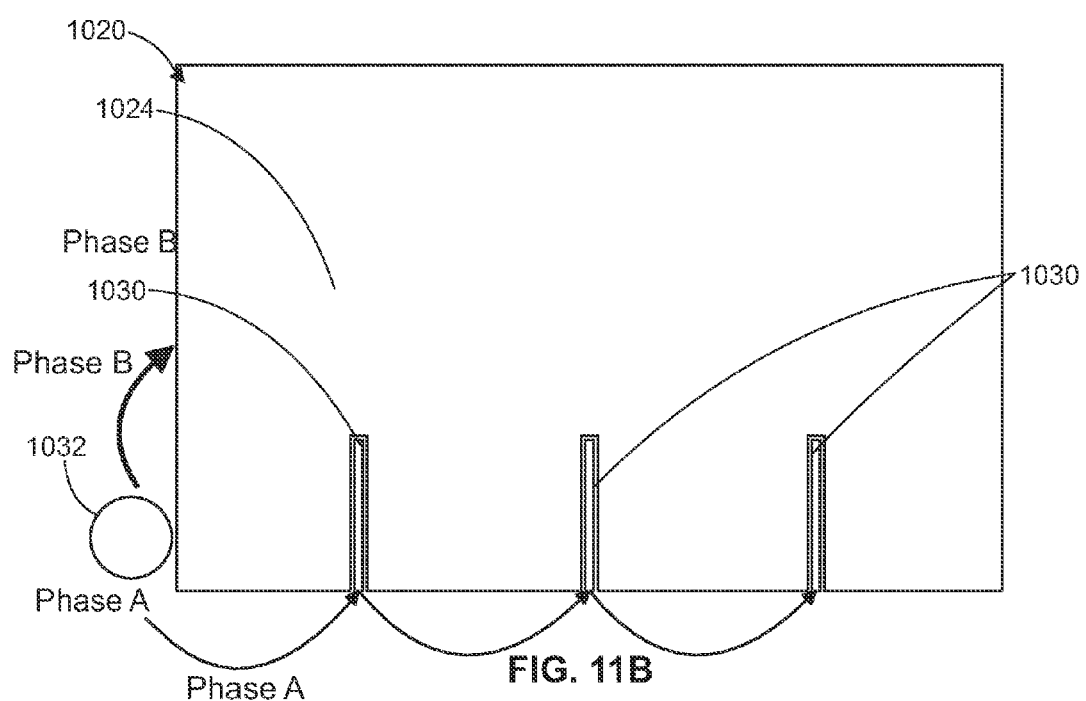

FIG. 11a-11b are front views showing the front and back surfaces respectively of a switchable liquid crystal diffuser film layer 1020 that may be substituted for the switchable diffuser film layer 916 in FIG. 9a. The switchable diffuser film layer 1020 includes a front layer 1022 shown in FIG. 11a and a back layer 1024 shown in FIG. 11b. A series of aperture areas 1026 extends through the front layer 1022. The aperture areas 1026 each have a tail-shaped region 1028 that is also formed on the front layer 1022 to provide electrical voltage to the entire aperture area 1026. The diffuser film layer 1020 in FIGS. 11a-11b is another alternative to accomplish the correct switching appearance where a complementary voltage from an AC voltage source 1032 is applied to a series of complementary tail-shaped regions 1030 on the bottom layer 1024 that corresponds to the tail-shaped regions 1028 where the connections are made on the top layer 1022. For example, voltage in phase A is applied to the aperture areas 1026 and the tail-shaped regions 1028 of the front layer 1022. Voltage in phase A is also applied to the corresponding tail-shaped regions 1030 of the back layer 1024. Voltage in phase B is applied to the entire area of the back layer 1004 and the remaining areas of the front layer 1022. Since the voltage to the aperture areas 1026 are opposite, the crystals in the liquid crystal diffuser film layer 1020 are transparent in the aperture areas 1026. The remaining areas in the front layer 1022 remain opaque because the voltage in those areas is in the same phase. Both sides in the tail-shaped region 1028 "see" the same AC voltage (phase A), and therefore the liquid crystal remains diffused in that area. Since the aperture areas 1026 are at opposite sides of the AC voltage, the aperture areas 1026 are transparent in the mechanical reel mode.

In this alternative, the tail-shaped areas 1028 at the bottom of the apertures 1026 could be made much larger, even as large as the width of the apertures with the corresponding increase in the complementary tail-shaped areas 1030 on the back layer 1024. This facilitates easier manufacturing of the switchable transmissive display 1000 in FIGS. 10a and 10b. Of course other shapes may be used for the apertures and different numbers of apertures may be used to match four or five reel underlying displays.

Figure 12A:
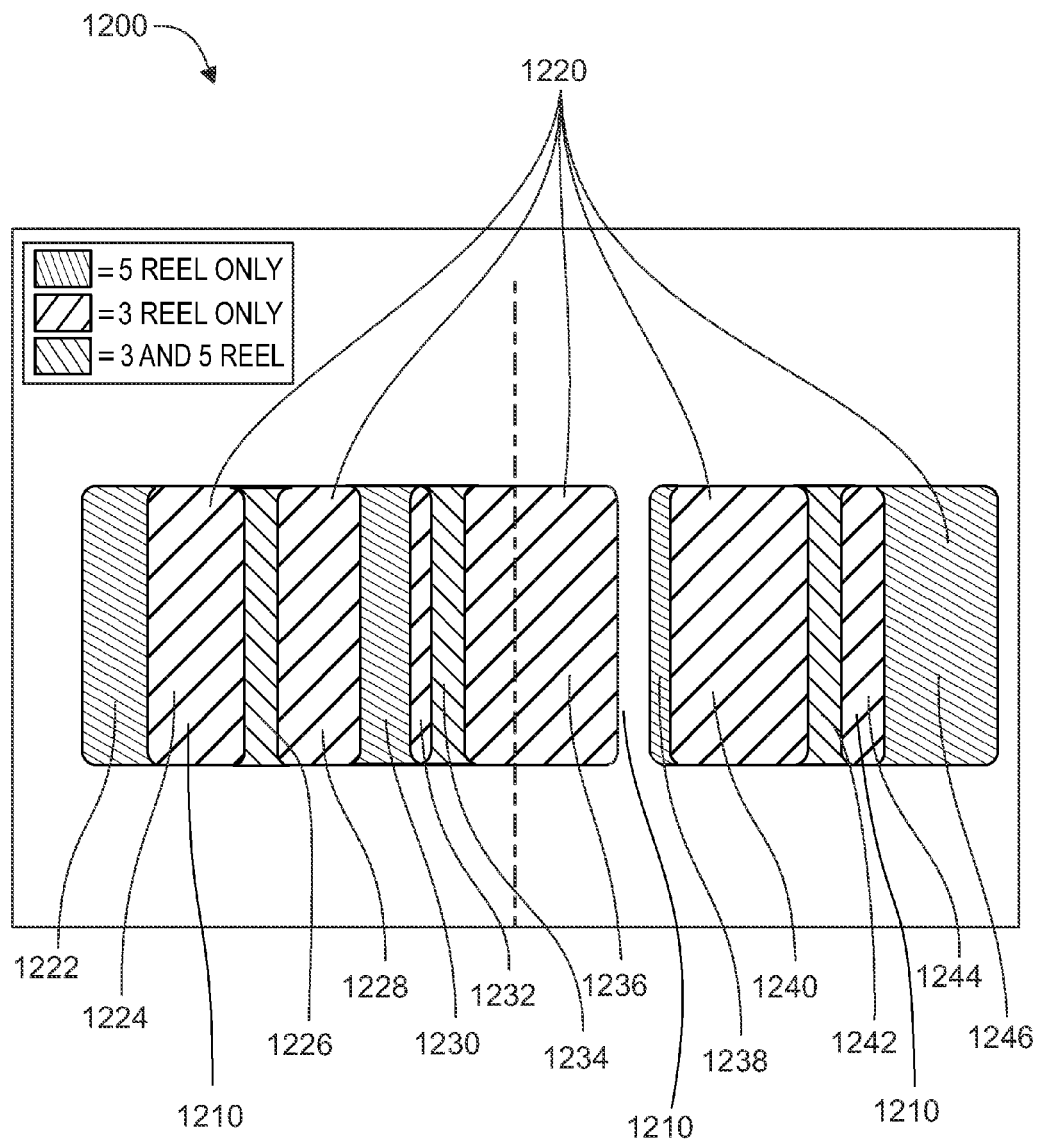
FIG. 12a is a front view of a transmissive display that allows the switching between three and five reel apertures.
Figure 12B:
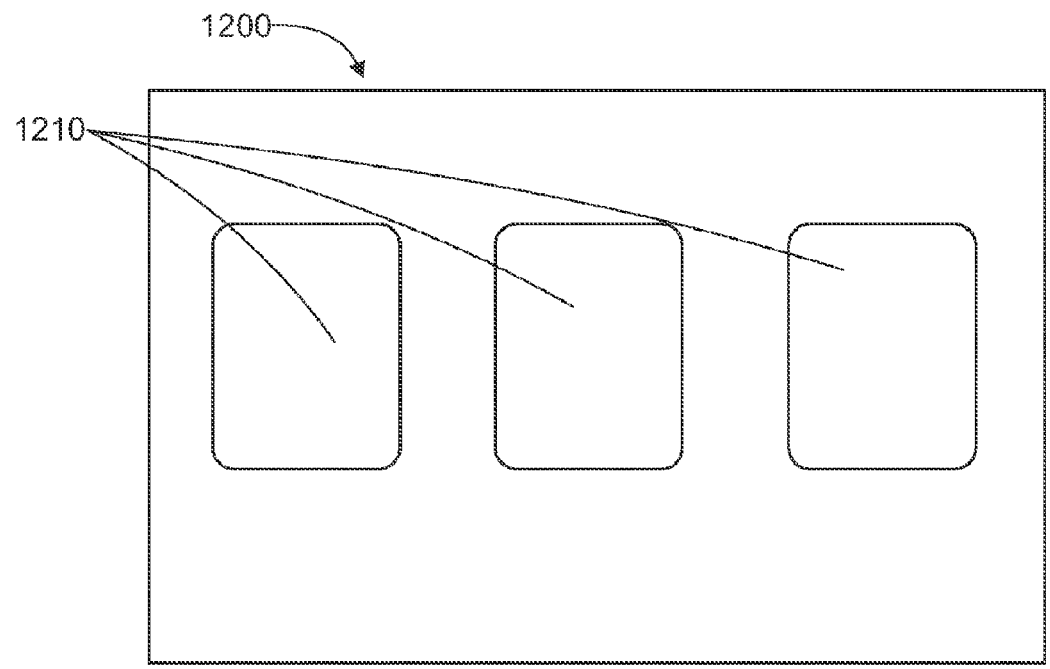
FIG. 12b is a front view of the transmissive display of FIG. 12a in three reel mode.
Figure 12C:
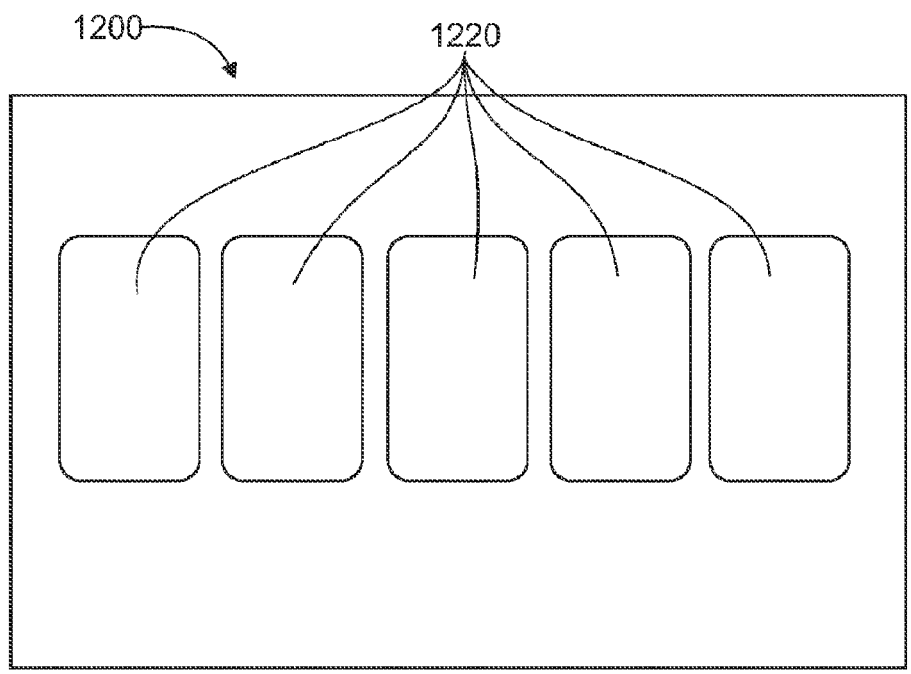
FIG. 12c is a front view of the transmissive display of FIG. 12a in five reel mode.

FIG. 12a shows a front view of a switchable diffuser film layer 1200 having a layout that allows two alternative mechanical reel modes to accommodate different underlying displays with different numbers of reels. The switchable diffuser film layer 1200 may be used in place of the switchable diffuser film layer 916 in FIG. 9a. The switchable diffuser film layer 1200 allows the front liquid crystal display to accommodate both three and five reel systems and provide a means for filling in the unused areas between the apertures used in both. In the underlying display mode, the switchable diffuser film layer 1200 allows the switch between three transparent apertures 1210 as shown in FIG. 12b and five transparent apertures 1220 as shown in FIG. 12c. All of the reel window apertures 1210 and 1220 are the same height in this example. FIG. 12a shows the geometry of the apertures 1210 and 1220 relative to each other. The electrodes for these apertures may be run from the bottom of each of the apertures and may be a transparent or thin wire such as that in FIG. 9a-c, a thin strip such as that in FIGS. 10a-10b or include a strip with a matching strip on the opposite surface as in FIGS. 11a-b.

By selectively applying the proper AC signals to areas of the front and back layers of the switchable diffuser layer 1200, a three reel window option shown in FIG. 12b or a five reel window option shown in FIG. 12c are created. In this example, the center area of the diffuser layer 1200 is divided into thirteen different areas 1222, 1224, 1226, 1228, 1230, 1232, 1234, 1236, 1238, 1240, 1242, 1244, and 1246, combinations of which are activated to create the three or five reel apertures 1210 and 1220. In this example, the areas 1224, 1228, 1232, 1236, 1240, and 1244 are always transparent when the diffuser layer 1200 is in the mechanical reels mode. If the three reel option is selected, the areas 1224, 1226, 1228, 1232, 1234, 1236, 1240, 1242, and 1244 are transparent while the areas 1222, 1230, 1238, and 1246 remain translucent. If the five reel option is selected, the areas 1222, 1224, 1228, 1230, 1232, 1236, 1238, 1240, 1244, and 1246 are transparent while the areas 1226, 1234, and 1242 remain translucent.

Figure 13A:
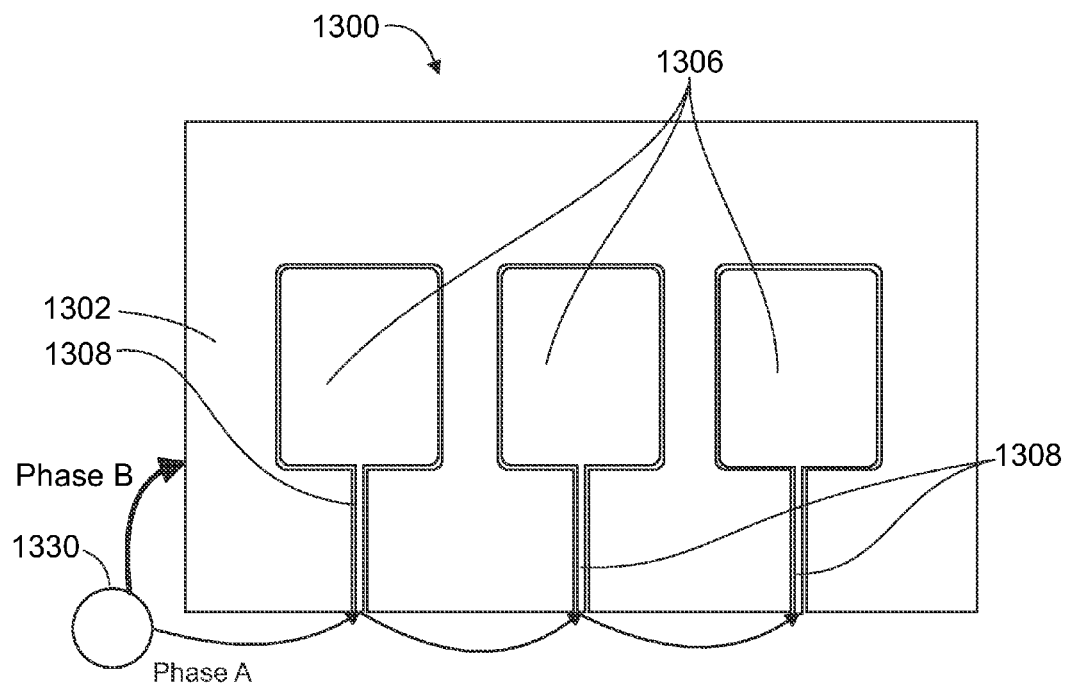
FIGS. 13a and 13b are the front views of the front and back surfaces of a switchable diffuser film according to a second example used with the display in FIG. 9a allowing switching between three and five reel apertures.
Figure 13B:
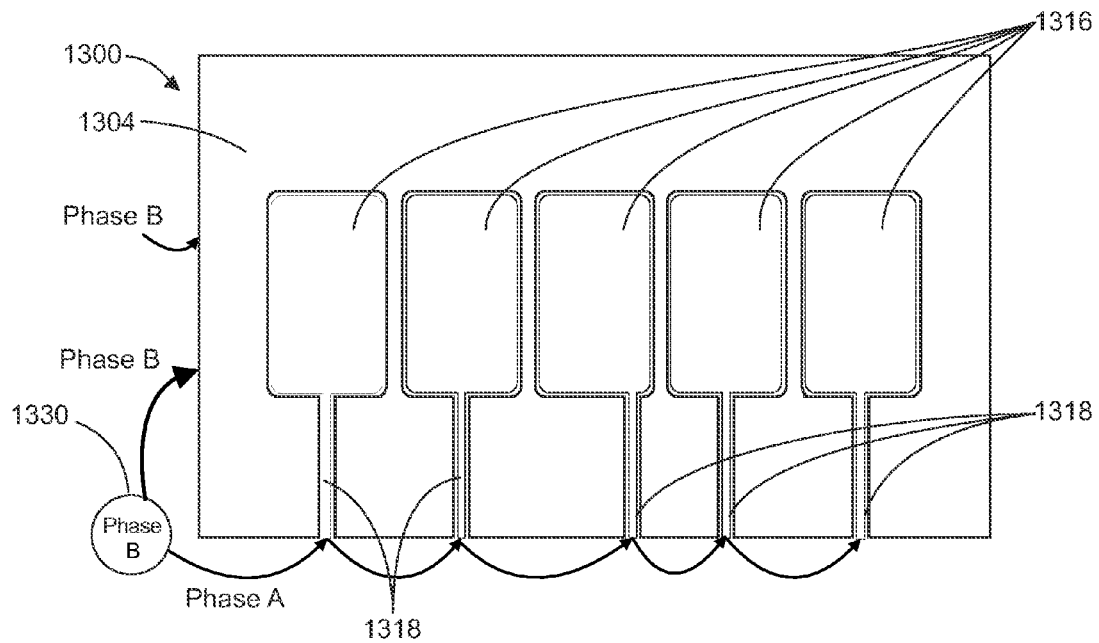

FIG. 13a-13b show the front and back surfaces respectively of a switchable liquid crystal diffuser layer 1300 that may be substituted for the switchable diffuser film layer 916 in FIG. 9a. The switchable diffuser layer 1300 allows the switchable transmissive display in FIG. 9a to be adapted to either a three reel mode (three reel apertures) or a five reel mode (five reel apertures) while in the mechanical reel mode. Of course, the switchable diffuser layer 1300 has a normal video mode that diffuses underlying light source and therefore blocks the view of the entirety of the underlying display. The switchable diffuser layer 1300 includes a front layer 1302 shown in FIG. 13a and a back layer 1304 shown in FIG. 13b. A series of three aperture areas 1306 is formed on the front layer 1302. The aperture areas 1306 each have a tail-shaped region 1308 that extends through the front layer 1302 to provide electrical voltage to the entire aperture area 1306 and the tail-shaped regions 1308. A series of five aperture areas 1316 is formed on the back layer 1304 as shown in FIG. 13b. The aperture areas 1316 each have a tail-shaped region 1318 that also extends through the back layer 1304 to provide electrical voltage to the entire aperture areas 1316 and the tail-shaped regions 1318. The center tail-shaped regions 1318 on the back layer 1304 are slightly offset to avoid being matched with the center tail-shaped regions 1308 on the front layer 1302.

The diffuser layer 1300 in FIGS. 13a-13b accomplishes the correct switching appearance when a complementary voltage from an AC voltage source 1330 is applied to the aperture areas 1306 and 1316 and the tail-shaped regions 1318 and 1328. For example, in the three reel mode, voltage in phase A is applied to the aperture areas 1306 and the tail-shaped regions 1308 of the front layer 1302. Voltage in phase B is applied to the entire area of the back layer 1304 including the aperture areas 1316, the tail-shaped regions 1318 and the remaining areas of the front layer 1302. The voltage to the aperture areas 1306 is opposite, resulting in the crystals in the diffuser layer 1300 to align, to allow transparency in the aperture areas 1306. The remaining areas in the front layer 1302 remain translucent because the voltage in these areas is in the same phase. Thus, the three apertures 1306 are transparent and correspond to three reels in an underlying display. As with the example in FIGS. 10a-10b, the tail-shaped regions 1308 are preferably relatively thin and may have a corresponding diffuser strip to conceal the regions 1308 in the three reel mode.

In the five reel mode, voltage in phase A is applied to the aperture areas 1316 and the tail-shaped regions 1318 of the back layer 1304. Voltage in phase B is applied to the entire area of the front layer 1302 including the aperture areas 1306, the tail-shaped regions 1308 and the remaining areas of the back layer 1304. The voltage to the aperture areas 1316 is opposite resulting in the crystals in the diffuser layer 1300 to align to allow transparency in the aperture areas 1316. The remaining areas in the back layer 1304 remain translucent because the voltage in these areas is in the same phase. Thus, the five apertures 1316 are transparent corresponding to five reels in an underlying display. As with the example in FIGS. 10a-10b, the tail-shaped regions 1318 are preferably relatively thin and may have a corresponding diffuser strip to conceal the regions 1318 in the five reel mode.

Figure 14A:
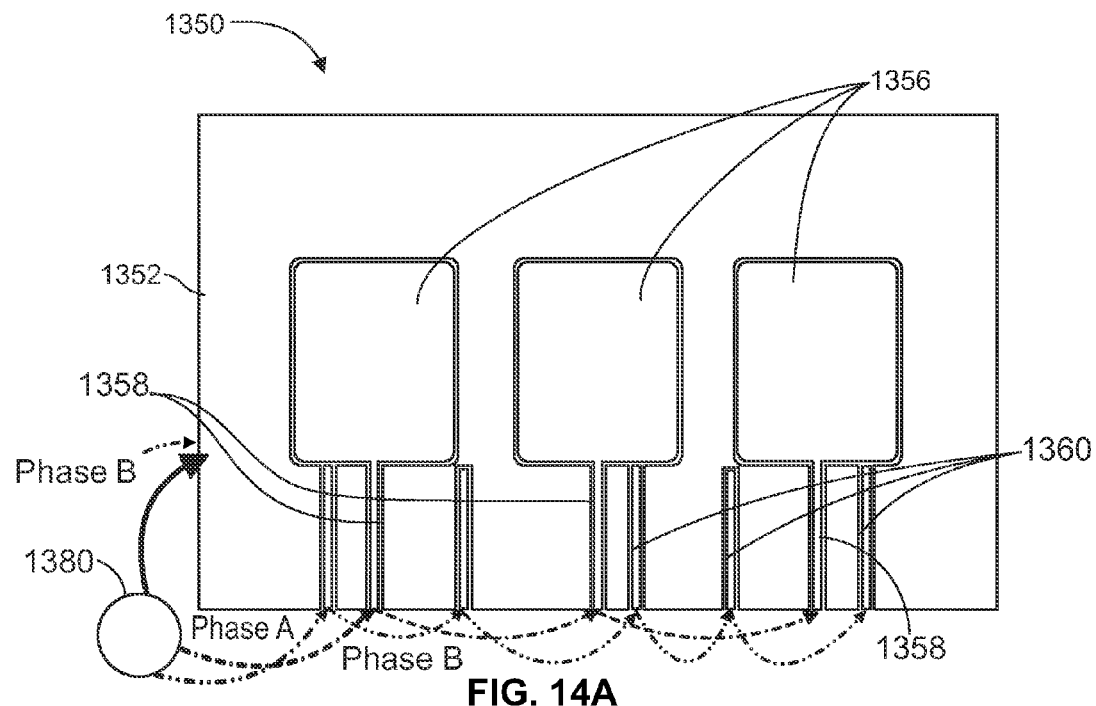
FIGS. 14a and 14b are the front views of the front and back surfaces of another example switchable diffuser film used with the display in FIG. 9a allowing switching between three and five reel apertures.
Figure 14B:
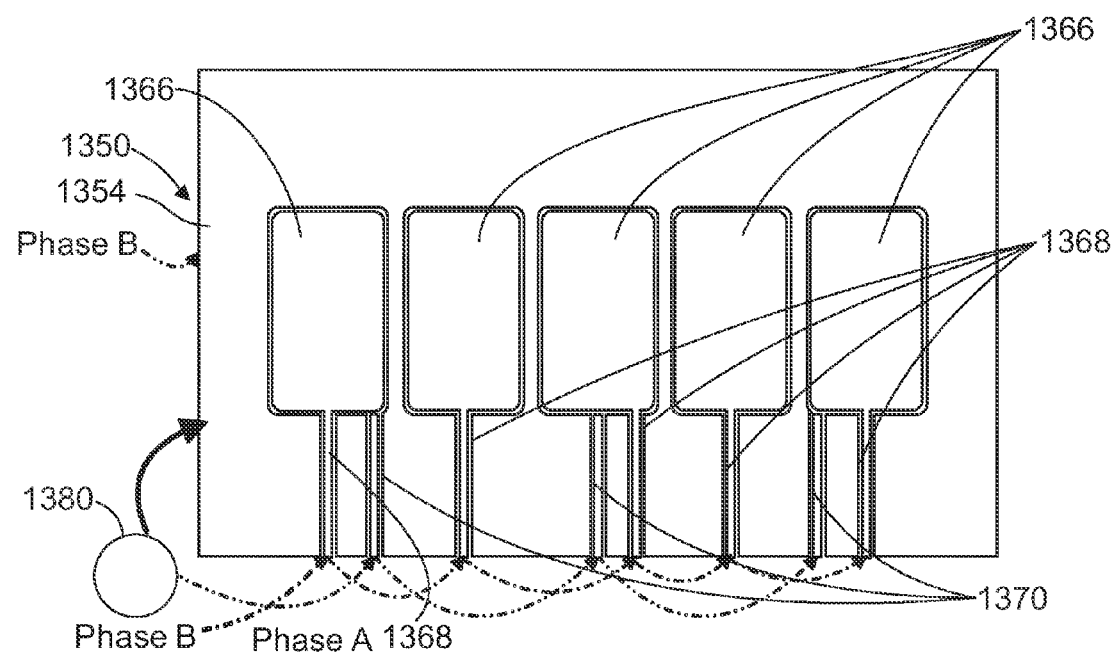

FIG. 14a-14b are front views showing the front and back surfaces respectively of an alternate switchable liquid crystal diffuser layer 1350 that may be substituted for the switchable diffuser film layer 916 in FIG. 9a. The diffuser layer 1350 allows the switchable transmissive display in FIG. 9a to be adapted to either a three reel mode (three reel apertures) or a five reel mode (five reel apertures) while in the mechanical reel mode in addition to the normal video mode. The switchable diffuser layer 1350 includes a front layer 1352 shown in FIG. 14a and a back layer 1354 shown in FIG. 14b. A series of three aperture areas 1356 is formed on the front layer 1352.

The aperture areas 1356 each have a tail-shaped region 1358 that also extends through the front layer 1352 to provide electrical voltage to the entire aperture areas 1356 and the tail-shaped regions 1358. A series of five aperture areas 1366 extends through the back layer 1354 as shown in FIG. 14*b*. The aperture areas 1366 each have a tail-shaped region 1368 that extends through the back layer 1354 to provide electrical voltage to the entire aperture area 1366 and the tail-shaped regions 1368. The front layer 1352 also includes five complementary tail-shaped regions 1360 that match the tail-shaped regions 1368 on the back layer 1354. The back layer 1354 also includes three complementary tail-shaped regions 1370 that match the tail-shaped regions 1358 of the front layer 1352.

The diffuser layer 1350 in FIGS. 14*a*-14*b* accomplish the correct switching appearance where a complementary voltage from an AC voltage source 1380 is applied to the aperture areas 1356 and 1366, the tail-shaped regions 1358 and 1368, and the complementary tail-shaped regions 1360 and 1370. For example, in the three reel mode, voltage in phase A is applied to the aperture areas 1356 and the tail-shaped regions 1358 of the front layer 1352. Voltage in phase A is also applied to the complementary tail-shaped regions 1370 of the back layer 1354. Voltage in phase B is applied to the entire area of the back layer 1354 including the aperture areas 1366, the tail-shaped regions 1368, and the remaining areas of the front layer 1352. The voltage to the aperture areas 1356 are opposite resulting in the crystals in the diffuser layer 1350 to align to allow transparency in the aperture areas 1356. The remaining areas in the front layer 1352 remain opaque because the voltage in these areas is in the same phase. Thus, the three apertures 1356 are transparent corresponding to three reels in an underlying display. The tail-shaped regions 1358 remain translucent (and hidden) because the voltage phase applied is the same.

In the five reel mode, voltage in phase A is applied to the aperture areas 1366 and the tail-shaped regions 1368 of the back layer 1354. Voltage in phase A is also applied to the complementary tail-shaped regions 1360 of the front layer 1352. Voltage in phase B is applied to the entire area of the front layer 1352 including the five aperture areas 1366, the tail-shaped regions 1358 and the remaining areas of the back layer 1354. The voltage to the aperture areas 1366 are opposite resulting in the crystals in the diffuser layer 1350 to align to allow transparency in the aperture areas 1366. The remaining areas in the back layer 1354 remain opaque because the voltage in these areas is in the same phase. Thus, the five apertures 1366 are transparent corresponding to five reels in an underlying display.

Figure 15A:
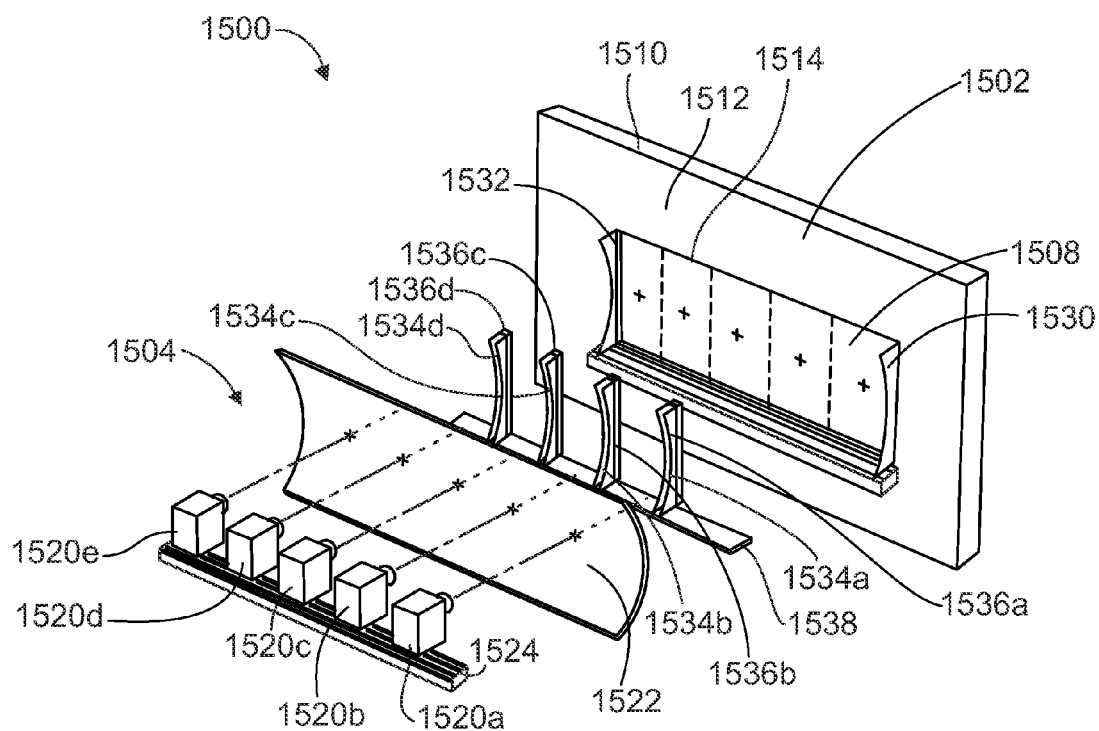
FIGS. 15a and c-d are exploded isometric perspective views and FIG. 15b is an unexploded cross-section view of a switchable transmissive display having projectors as an underlying display with a video mode and allowing switching between three and five reel aperture simulated mechanical reel modes.
Figure 15B:
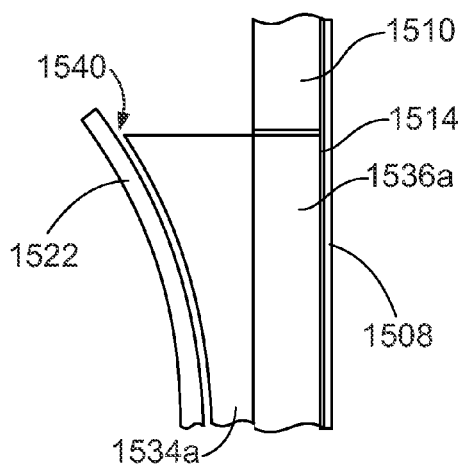

FIGS. 15*a* and *c*-*d* are exploded isometric perspective views and FIG. 15*b* is an unexploded cross-section view of a switchable transmissive display 1500 that uses projectors to simulate reels as an underlying display. The transmissive display 1500 includes an overlaying display which is a touch screen transmissive panel 1502 and an underlying display which is a projected reel display system 1504. The switchable transmissive display 1500 has a full video mode and a underlying display mode. In the underlying display mode, the transmissive display 1500 may be adjusted to show three to five reels in this example.

The transmissive panel 1502 includes an LCD panel similar to the LCD panel described in FIGS. 5*a*-*c* above and may include a touch screen similar to that shown in FIG. 5*c*. A layer of smart switchable diffuser film 1508 may be controlled to switch between the underlying display mode or the full video mode. A light guide 1510 is positioned on a reflector 1512 to guide light to the transmissive panel 1502. The light guide 1510 includes a transmissive aperture 1514 to provide viewable access to the underlying display.

FIG. 15*a* shows an exploded view of the components of the switchable transmissive display 1500. The underlying display is a projection system 1504 that includes a series of moveable projectors 1520*a*-*e* and a curved screen 1522. The moveable projectors 1520*a*-*e* are moved on a track 1524 and may be positioned relative to the transmissive aperture 1514. The center projector 1520*c* is fixed, while the pairs of projectors 1520*a*-*b* and 1520*d*-*e* may be moved on the track 1524. In this example, each projector 1520*a*-*e* projects an image such as a mechanical reel on the curved screen 1522 to show images on the underlying display. Each projector 1520*a*-*e* is a full color projector with red, green, and blue LEDs (not shown).

Two fixed barriers 1530 and 1532 are mounted on the back surface and frame the transmissive aperture 1514. The two fixed barriers 1530 and 1532 serve to focus the projected images from the projectors 1520*a*-*e*. An additional set of four moveable barriers 1534*a*-*e* and corresponding dividers 1536*a*-*d* are mounted on a track 1538 and may be positioned relative to each other depending on the three reel or five reel mode. FIG. 15*b* is a side view of the configuration assembled in FIG. 15*a* focusing on the barrier 1534*a* and the divider 1536*a*. The barrier 1534*a* is crescent shaped to match the curve of the curved screen 1522. The curved screen 1522 may include a switchable diffuser layer similar to the diffuser layer 1508 to provide more light on the projected images in the underlying display mode. The barrier 1534*a* is attached to the divider 1536*a* which is moveable within the aperture 1514. A gap 1540 is created between the barriers 1530, 1532, and 1534*a*-*d* and the curved screen 1522.

The curved screen 1522 may use the lights from the projectors 1520*a*-*e* to backlight the aperture 1514 when in full video mode. A single projector may be used in place of the multiple projectors to project images of multiple reels depending on the reel mode.

Figure 15C:
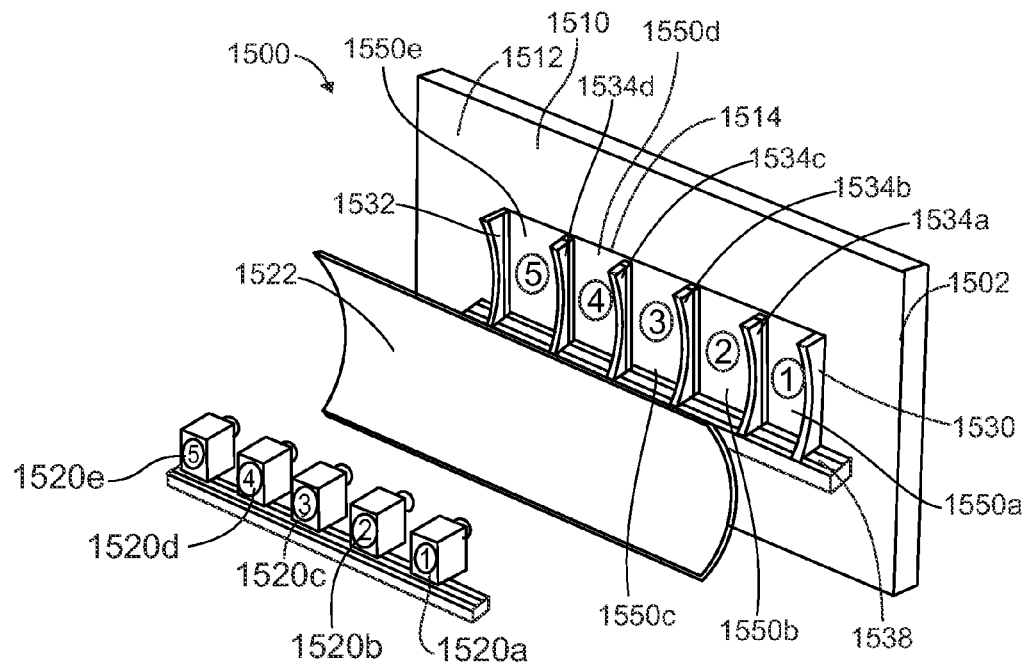

As explained above, the transmissive display 1500 has a full video mode in which the switchable glass 1508 in the LCD display system 1502 is translucent thus totally obscuring the underlying display. The transmissive display also has a reel mode that provides either three reel or five mode operation. FIG. 15*c* shows the switchable transmissive display 1500 in five reel mode. In FIG. 15*c*, the moveable barriers 1534*a*-*d* have been positioned on the track 1538 to divide the transmissive aperture into five windows 1550*a*-*e*. The projectors 1520*a*-*b* and 1520*d*-*e* have also been positioned to project images into the now created five windows 1550*a*-*e*. The barriers 1534*a*-*d* in conjunction with the fixed barriers 1530 and 1532 serve to channel the back light from the light guide of the LCD display system 1502.

Figure 15D:
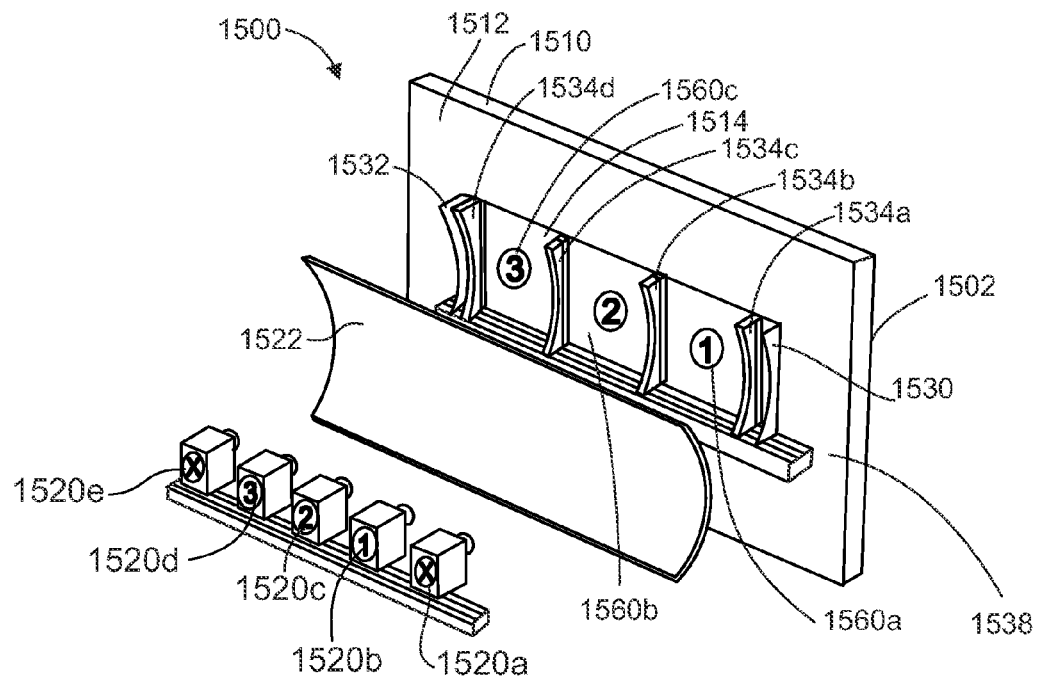

FIG. 15*d* shows the transmissive display 1500 in a three reel mode. In this mode, the outer projectors 1520*a* and 1520*e* are deactivated and have been moved to the sides of the transmissive aperture 1514. The projectors 1520*b* and 1520*d* are positioned relative to the fixed center projector 1520*c* to create three images on the curved screen 1522. The dividers 1534*a* and 1534*d* are moved next to the fixed dividers 1530 and 1532 respectively and the dividers 1534*b* and 1534*c* are positioned to create three windows 1560*a*-*c* on the transmissive aperture 1514. As shown, the projectors 1520*b*, 1520*c*, and 1520*d* project images to the respective windows 1560*a*, 1560*b*, and 1560*c*.

Each of these embodiments and obvious variations thereof is contemplated as falling within the spirit and scope of the claimed invention, which is set forth in the following claims.

What is claimed is:

1. A gaming system display comprising:
a first underlying display; and
a second display disposed to overlay at least a portion of the first underlying display, the second display including a transmissive liquid crystal panel, a backlight assembly, and a switchable diffuser film layer assembly between the transmissive liquid crystal panel and the backlight assembly, the backlight assembly including a transmissive aperture behind which a corresponding portion of the first underlying display is positioned, and the switchable diffuser film layer assembly including a first film layer with an applied first voltage, a second film layer with an applied second voltage, and a liquid crystal layer positioned between the first and second film layer, wherein the second display further includes a supplemental backlight directed to the aperture; and
wherein the first film layer of the switchable diffuser film layer assembly includes a segmenting gap defining an aperture area electrically insulated from the remainder of the first film layer, the aperture area having an applied aperture voltage;
wherein a region of the liquid crystal layer corresponding to the aperture area is transparent in a first mode where the aperture voltage and the second voltage are in opposite voltage polarity to allow viewing of the at least a portion of the first display, and the region of the liquid crystal layer corresponding to the aperture area is translucent in a second mode where the aperture voltage and the second voltage are in common voltage polarity to obscure the transmissive aperture.

2. The gaming system display of claim 1, wherein the first underlying display is one of a mechanical reel, a video display or a simulated mechanical slot reel.

3. The gaming system display of claim 1, wherein the switchable diffuser film layer assembly includes a first set of aperture areas of the first film layer corresponding with the transmissive aperture and a second set of aperture areas on the second film layer corresponding with different transmissive apertures, and the region of the liquid crystal layer corresponding to one of the first and second sets of aperture areas is transparent via the application of opposite voltage polarity to the respective the first and second sets of aperture areas during the first mode.

4. The gaming system display of claim 3, wherein electrodes power the first and second sets of aperture areas via a tail, wherein voltage with common voltage polarity is applied to the first and second sets of aperture areas obscure the tail in the first mode.

5. The gaming system display of claim 3, wherein the first set of aperture areas corresponds with the underlying display including three reels, and the second set of aperture areas corresponds with the underlying display including five reels.

6. The gaming system display of claim 1, wherein the switchable diffuser layer assembly entirely obscures the first underlying display in the second mode.

7. A gaming system display comprising:
a first underlying display; and
a second display disposed to overlay at least a portion of the first underlying display, the second display including a transmissive liquid crystal panel, a switchable diffuser film layer assembly, and a backlight assembly including a transmissive aperture behind which a corresponding portion of the first underlying display is positioned, the switchable diffuser film layer assembly including a first film layer, a second film layer, a liquid crystal layer positioned between the first and second film layer, the first film layer including an aperture area corresponding to the at least a portion of the first underlying display defined by a gap in the first film layer, the aperture area electrically insulated from the remainder of the first film layer;
wherein the second display operates in a first mode to allow direct viewing of the at least a portion of the first display via switching a part of the liquid crystal layer of the switchable diffuser film layer assembly corresponding to the aperture area to a transparent state by applying an opposite voltage polarity to the aperture area and the second film layer, and the second display operates in a second mode to obscure the transmissive aperture via switching the part of the liquid crystal layer of the switchable diffuser film layer assembly corresponding to the aperture area to a translucent state by applying a common voltage polarity to the aperture area and the second film layer.

8. The gaming system display of claim 7, wherein the backlight assembly includes a diffuser sheet diffusing light to the second display.

9. The gaming system display of claim 7, wherein the switchable diffuser film layer assembly includes a first set of aperture areas on the first film layer corresponding with the transmissive aperture and a second set of aperture areas on the second film layer corresponding with different transmissive apertures, and the region of the liquid crystal layer corresponding to the first or second sets of aperture areas is transparent via the application of opposite voltage polarity to the respective first or second sets of aperture areas in the first mode.

10. The gaming system display of claim 9, wherein electrodes power the first and second sets of aperture areas via a tail, wherein voltage with common voltage polarity is applied to the first and second sets of aperture areas obscure the tail in the first mode.

11. The gaming system display of claim 9, wherein the first set of aperture areas corresponds with the underlying display including three reels, and the second set of aperture areas corresponds with the underlying display including five reels.

12. The gaming system display of claim 7, wherein the first underlying display is one of a mechanical reel, a video display or a simulated mechanical slot reel.

13. The gaming system display of claim 7, wherein the first underlying display includes at least one projector having red, blue and green lights, the projector cycling power to the red, blue and green lights to project an image in the first mode.

14. The gaming system display of claim 7, wherein the switchable diffuser layer assembly entirely obscures the first underlying display in the second mode.

15. The gaming system display of claim 7, wherein the backlight assembly includes an illumination layer, a backlight, and a reflective layer.

16. The gaming system display of claim 15, wherein the backlight is one of an electroluminescent panel (ELP), an LED panel, an OLED panel, an incandescent light bulb, a cold cathode fluorescent lamp (CCFL), or a hot cathode fluorescent lamp (HCFL).

17. The gaming system display of claim 1, wherein the first underlying display includes at least one projector having red, blue and green lights, the projector cycling power to the red, blue and green lights to project an image in the first mode.

18. The gaming system of claim 17, wherein the at least one projector provides white light to backlight the second display in the second mode.

19. The gaming system display of claim 1, wherein the backlight assembly further includes an illumination layer, a backlight, and a reflective layer.

20. The gaming system display of claim 19, wherein the backlight is one of an electroluminescent panel (ELP), an LED panel, an OLED panel, an incandescent light bulb, a cold cathode fluorescent lamp (CCFL), or a hot cathode fluorescent lamp (HCFL).

\* \* \* \* \*